(12) United States Patent
Sana et al.

(10) Patent No.: US 8,876,514 B2
(45) Date of Patent: Nov. 4, 2014

(54) MOLD USED FOR MANUFACTURING COMPOSITE MATERIAL STRUCTURE

(75) Inventors: Toshikazu Sana, Kakamigahara (JP); Tomoya Takahashi, Ibi-gun (JP); Chuzaburou Okamoto, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 87 days.

(21) Appl. No.: 13/518,903

(22) PCT Filed: Dec. 21, 2010

(86) PCT No.: PCT/JP2010/007391
§ 371 (c)(1),
(2), (4) Date: Jul. 25, 2012

(87) PCT Pub. No.: WO2011/077698
PCT Pub. Date: Jun. 30, 2011

(65) Prior Publication Data
US 2012/0305195 A1    Dec. 6, 2012

(30) Foreign Application Priority Data

Dec. 25, 2009   (JP) ................................. 2009-295575

(51) Int. Cl.
*B29C 33/48*  (2006.01)
*B64F 5/00*   (2006.01)
*B29C 33/38*  (2006.01)
*B29C 33/76*  (2006.01)
*B29L 31/30*  (2006.01)
*B29C 70/44*  (2006.01)

(52) U.S. Cl.
CPC ............. *B64F 5/0009* (2013.01); *B29C 33/485* (2013.01); *B29C 33/38* (2013.01); *B29C 33/76* (2013.01); *B29L 2031/3082* (2013.01); *B29C 70/446* (2013.01)

USPC ........ 425/179; 425/403; 425/451.9; 249/184; 249/177; 156/349; 292/342; 292/137

(58) Field of Classification Search
CPC .... B29C 33/485; B29C 33/76; B29C 70/446; B29L 2031/3082
USPC ............ 425/179, 403, 450.9, 451.9; 264/184, 264/177; 156/349; 292/342, 137; 249/184, 249/177
See application file for complete search history.

(56) References Cited

U.S. PATENT DOCUMENTS 7,166,251 B2 *  1/2007  Blankinship ................... 264/258
2009/0033013 A1 *  2/2009  Cleary et al. .................. 269/48.1

(Continued)

FOREIGN PATENT DOCUMENTS

JP    U-5-24321    3/1993
JP    A-10-16085   1/1998

(Continued)

OTHER PUBLICATIONS

International Search Report issued in International Application No. PCT/JP2010/007391 on Feb. 8, 2011 (with translation).

*Primary Examiner* — Joseph S Del Sole
*Assistant Examiner* — Lawrence D Hohenbrink, Jr.
(74) *Attorney, Agent, or Firm* — Oliff PLC

(57) ABSTRACT

In a mold used for manufacturing a composite material structure of the present invention, first segments and second segments each having a plate shape and a convex-shaped obverse surface are each fastened at its end surface to support rings one by one, with the obverse surface being at an upper side, and adjacent segments are joined together at side surfaces thereof, to retain them as a cylindrical mold. In this configuration, in the mold having a substantially cylindrical shape and being dividable into a plurality of segments, the segments are assembled in the cylindrical shape with high position accuracy and in a simplified manner.

13 Claims, 24 Drawing Sheets

(56) References Cited

U.S. PATENT DOCUMENTS

2010/0083504 A1    4/2010   Johnson et al.
2010/0223772 A1    9/2010   Johnson et al.

FOREIGN PATENT DOCUMENTS

JP    A-2007-532384    11/2007
WO   WO 2006/001860 A2    1/2006

\* cited by examiner

MOLD USED FOR MANUFACTURING COMPOSITE MATERIAL STRUCTURE

TECHNICAL FIELD

The present invention relates to a mold used for manufacturing a composite material structure using a fiber-reinforced resin composite material. Particularly, the present invention relates to a mold which is suitably used for manufacturing a huge composite material structure for use as a fuselage of an aircraft, etc., and is dividable into a plurality of segments.

BACKGROUND ART

In recent years, fiber-reinforced resin composite materials (hereinafter suitably referred to as "composite materials") have been widely used in fields in which metal materials have been used so far. Among the composite materials, carbon-fiber-reinforced composite materials which are formed such that carbon fibers used as reinforced fibers, are impregnated with matrix resin such as epoxy resin, have a smaller weight and a higher strength than metal materials. Because of this, the carbon-fiber-reinforced composite materials are widely used in fields of sport activity articles, industrial machines, and aerospace.

Among these fields, in the field of aerospace, for example, in structures such as wings or a fuselage of an aircraft, a stiffened panel in which a skin comprising a composite material is integrated with a stiffener which is a lightweight metal frame member, has been used. As a typical stiffener, there is a stringer. Stringers are combined to conform in shape to the structure, and supported by jigs. Plural sheets of prepreg are laminated (stacked) together with the stringers, and the resulting laminate is pressurized and heated in an autoclave. As a result, the prepreg is cured into the skin, and the stiffeners are adhesively attached to and integrated with the skin, thereby forming a stiffened panel.

As an exemplary structure comprising the stiffened panel, as shown in FIG. 24, there is a fuselage 101 or the like of an aircraft which is formed as a one piece barrel (OPB). The fuselage 101 includes a skin 102 and a plurality of stringers 103 adhesively attached to the inner surface of the skin 102, and has an opening 104 which becomes a door when the fuselage 101 is assembled as the aircraft and openings 105 which become windows when the fuselage 101 is assembled as the aircraft.

As a technique for manufacturing the above stated structure of the aircraft, there is known a composite barrel section of an aircraft fuselage as disclosed in Patent Literature 1. According to this Patent Literature, the barrel section is defined as "an enclosed shell structure extending 360 degrees about an axis". To manufacture this barrel section, a mold configured such that a plurality of (e.g., six) tool segments are arranged in a cylindrical shape and supported by using tool fixtures.

Patent Literature 1 discloses as an exemplary manufacturing system of the composite barrel section, a plurality of manufacturing stations are laid out in series and a barrel section tool assembly (hereinafter referred to as a tool assembly) including the mold is introduced into each of the manufacturing stations.

To be specific, firstly, in a stiffener loading station, a plurality of stiffener grooves formed on the respective tool segments are loaded with a plurality of stiffeners, and then the tool segments are loaded into the tool fixtures and supported in a cylindrical shape, thereby forming a single mold (tool assembly in the same Patent Literature). At this time, the tool fixtures are rotatably supported on a tool support structure by means of a plurality of rollers such that the tool fixtures are rotatable along their longitudinal axis.

Then, the mold supported and constructed in the cylindrical shape is transported to a skin laminating station by the tool support structure. Here, the mold is rotated along the longitudinal axis, to laminate fiber tow (bundle of untwisted continuous filaments which is impregnated with thermosetting resin) by a fiber placement machine, thereby forming a laminate (corresponding to skin) on the outer periphery of the mold.

Then, the mold (tool assembly in the same Patent Literature) provided with the laminate is transported to a vacuum station by the tool support structure. Here, a pressure pad is installed on the outer periphery of the laminate, and a vacuum bag is installed on the periphery of the laminate to evacuate the vacuum bag. Then, the mold (tool assembly) attached with the vacuum bag is transported to a curing station by a gantry beam and is treated in an autoclave, to cure the laminate and the stiffener. In this way, the laminate and the stiffener are cured to form a stiffened panel on the outer periphery of the mold.

The mold (tool assembly) provided with the stiffened panel is transported to an inspection station by the gantry beam. The cured laminate (skin) is inspected to check whether or not it has voids or disbonds. Then, the cured laminate (skin) is transported to a trimming station by the gantry beam and subjected to trimming and drilling operations. Then, the tool segments are removed from the stiffened panel and the stiffened panel is returned to the stiffener loading station, and the stiffened panel (tool assembly) from which the tool segments have been removed is transported to a final assembly station by the tool support structure. The stiffened panel is attached with a plurality of frame sections, thereby completing a composite barrel section.

The cylindrical mold used for manufacturing the OPB is fundamentally divided into a plurality of segments, for example, six segments. The segments are assembled into the cylindrical shape after the segments are attached with the stiffeners.

CITATION LISTS

Patent Literature

Patent Literature 1: Translated PCT Application Publication No. 2007-532384

SUMMARY OF THE INVENTION

Technical Problem

Since the OPB which is a molded product is huge in size like the fuselage of the aircraft, it is difficult to assemble the segments of the cylindrical mold in a cylindrical shape or disassemble the assembled mold into parts. This work is very messy.

For example, in the case of the fuselage of the aircraft, its dimension is extremely great, for example, its diameter is about 4 to 6 m, and a length of the cylindrical shape is about 5 to 15 m. The stiffened panel (skin and stiffener) constituting the fuselage has a very small thickness with respect to the overall fuselage. Therefore, the mold used for manufacturing the stiffened panel is substantially equal in dimension to the outer shape of the fuselage. As disclosed in Patent Literature 1, the segments (tool segments in the same Patent Literature) of the mold are manufactured using metal such as "steel, invar, aluminum, or composites". It is not easy to assemble the pieces which are huge and heavy into a single mold.

If unevenness occurs on the outer periphery of the cylindrical shape outer periphery when the plurality of segments are assembled into the single cylindrical mold, the stiffened panel formed on the outer periphery of the mold will have unevenness. For this reason, when the mold is assembled, it is necessary to ensure position accuracy so that a smooth outer peripheral surface is formed by the segments, rather than merely assembling the segments in a substantially cylindrical shape. Therefore, assembling the metal pieces which are huge into a cylindrical shape with high position accuracy is very difficult and messy.

The present invention is directed to solving the above mentioned problem, and an object of the present invention is to provide a technique in which segments of a mold which is used for manufacturing a composite material structure such as a fuselage of an aircraft, has a substantially cylinder shape, and is dividable into a plurality of segments are assembled into a cylindrical shape, with high position accuracy and in a simple manner.

Solution to Problem

To solve the above mentioned problems, according to the present invention, a mold used for manufacturing a composite material structure, the mold being inserted into the composite material structure of a substantially cylindrical shape, and used, comprises a plurality of segments of at least two kinds, the segments having a rectangular plate shape and each having an obverse surface having a convex-shape, the obverse surface being one of main surfaces of each of the segments; and a pair of annular retaining members for fastening both end surfaces of each of the plurality of segments; wherein the plurality of segments are retained as a single cylindrical member such that the end surfaces of each of the plurality of segments are fastened to the annular retaining members in a state where the obverse surface of each of the plurality of segments faces outward, and side surfaces of adjacent segments are joined together.

In accordance with this configuration, the segments are fastened to the annular retaining members one by one, assembled in an annular shape, and joined together to construct a single cylindrical mold. This allows the individual segments to be positioned easily and with high accuracy. Therefore, the mold can be assembled easily and the outer peripheral surface of the assembled mold can be made smooth with a minimum level difference.

In the mold, preferably, the plurality of segments may include a first segment having a shape in which side surfaces thereof face a horizontal direction or a direction which is inclined upwardly with respect to the horizontal direction, in a state where the first segment is placed such that the obverse surface thereof is at an upper side; and a second segment having a shape in which side surfaces thereof face a direction which is inclined downwardly with respect to the horizontal direction, in a state where the second segment is placed such that the obverse surface thereof is at the upper side.

In accordance with this configuration, since the first segment and the second segment have the above described shape, the second segments are firstly placed and fastened, and then the first segment is lifted in a 12 o'clock direction (vertically upward direction, upward) upward direction and fitted between the second segments. In this way, the first or second segment can be fastened to the annular retaining members one by one with the same motion in which it is lifted in the 12 o'clock direction. This allows the individual segments to be assembled easily and properly in the cylindrical shape.

In the above configuration, preferably, the mold comprises an annular fastening/retaining mechanism which lifts up the first segment or the second segment, fasten the end surfaces of the first segment or the second segment to fastening surfaces of the annular retaining members, and retain a state in which the end surfaces of the first segment or the second segment are fastened to the fastening surfaces of the annular retaining members. The annular fastening/retaining mechanism can retain the state in which the end surfaces of the segments are fastened properly to the fastening surfaces of the annular retaining members.

The specific configuration of the annular fastening/retaining mechanism is not particularly limited. Preferably, the annular fastening/retaining mechanism includes a male fastener member provided on each of the end surfaces of the first segment or the second segment and including a protruding portion protruding in a direction from a reverse surface of the segment toward the obverse surface of the segment; a female fastener member provided on the fastening surface of each of the annular retaining members and having a recess or an opening formed to extend in the direction from the reverse surface of the segment toward the obverse surface of the segment, the protruding portion of the male fastener member being inserted into the recess or the opening when the segment is lifted up; and a fastened state retaining member provided on either each of the end surfaces of the segment or the fastening surface of each of the annular retaining members, to retain a state in which the male fastener member is inserted into the female fastener member.

In accordance with this configuration, since the annular fastening/retaining mechanism includes the male fastener member, the female fastener member and the fastened state retaining member, the end surface can be fastened and retained to the annular retaining member when the segment is lifted in the 12 o'clock direction and fastened to the annular retaining member.

The number and positional relationship of the male fastener member and the female fastener member are not particularly limited. For example, preferably, the male fastener member includes two male fastener members provided on each of the end surfaces of the first segment or the second segment; and the female fastener member includes female fastener members provided on the fastening surface of each of the annular retaining members to correspond to the two male fastener members, respectively.

In accordance with this configuration, one segment is provided with four male fastener members, to be precise, two on each of the end surfaces. For example, the segments can be lifted up by a four-point support jack and assembled while adjusting their positions precisely. Therefore, assembling and fastening of the mold can be implemented with high accuracy.

The specific configurations of the male fastener member and the female fastener member are not particularly limited. For example, preferably, the protruding portion of the male fastener member has a through-hole into which the protruding portion is inserted; the fastened state retaining member includes a wedge member positioned such that the wedge member is extendable to and retractable from the protruding portion of the male fastener member inserted into the recess or the opening of the female fastener member; and the wedge member being movable to an advanced position toward the protruding portion and inserted into the through-hole of the protruding portion to retain a state in which the male fastener member is inserted into the female fastener member.

In accordance with this configuration, by using the wedge member as the fastened state retaining member, the state in which the male fastener member is inserted into the female fastener member can be maintained stably. Therefore, with a simple configuration, the end surface of each segment can be fastened to the fastening surface of the annular retaining member.

Furthermore, in accordance with this configuration, the mold preferably further comprises an annular fastening/guide mechanism for positioning the protruding portion of the male fastener member when the protruding portion is inserted into the recess or the opening of the female fastener member. This facilitates positioning when the segment is fastened to the annular retaining member.

The specific configuration of the annular fastening/guide mechanism is not particularly limited. For example, preferably, the annular fastening/guide mechanism includes a male guide member provided to protrude from each of the end surfaces of the first segment or the second segment; and a female guide member provided on the fastening surface of each of the annular retaining members in a location corresponding to the male guide member, the female guide member having a cutout or a recess into which the male guide member is inserted.

In accordance with this configuration, the segments to be assembled are each provided with the male guide member, and the annular retaining members which become the frame in assembling of the segments are each provided with the female guide member, as the annular fastening/guide mechanism. Therefore, the annular fastening/guide mechanism effectively operates as a guide when the segment is lifted up and fastened.

The mold having the above configuration preferably further comprise a segment joining/retaining mechanism provided on each of the side surfaces of the first segment or the second segment to join the side surfaces of different segments, and to retain a state in which the side surfaces are joined together.

In accordance with this configuration, since each of the first segment and the second segment is provided with the segment joining/retaining mechanism on the side surface thereof, the segments can be joined together properly and retained.

The specific configuration of the segment joining/retaining mechanism is not particularly limited. For example, the segment joining/retaining mechanism includes: a male joining member provided on each of the side surfaces of the first segment and having a protruding portion protruding in a direction from the reverse surface of the first segment toward the obverse surface of the first segment; a female joining member provided on each of the side surfaces of the second segment in a location corresponding the male joining member and having a recess or an opening into which the protruding portion is inserted; and a joined state retaining member provided on each of the side surfaces of the first segment or each of the side surfaces of the second segment to retain a state in which the male joining member is inserted into the female joining member.

In accordance with this configuration, the first segment is provided with the male joining member and the second segment is provided with the female joining member, as the segment joining/retaining mechanism, and further, the joined state retaining member is provided to retain the joined state by using the joining members. Therefore, the second segment is firstly fastened to the annular retaining member, then the first segment is inserted between the second segments and these segments are joined together.

In this configuration, preferably, the second segment is provided on each of the side surfaces with an cave portion in which an edge portion connected to the obverse surface protrudes outward relative to the side surface; and the female joining member is provided on each of the side surfaces of the second segment such that the female joining member is hidden by the cave portion when viewed from the obverse surface.

In accordance with this configuration, the female joining member is hidden by the cave portion, when viewed from the obverse surface, in the second segment whose side surface is inclined toward the reverse surface. Therefore, there is no great gap between the obverse surfaces of the segments, and thus, the outer peripheral surface of the cylindrical mold can be made a substantially continuous surface.

In accordance with this configuration, preferably, the protruding portion of the male joining member has a through-hole penetrating the protruding portion; the joined state retaining member includes a wedge member positioned such that the wedge member is extendable to and retractable from the protruding portion of the male fastener member inserted into the recess or the opening of the female joining member; and the wedge member being movable to an advanced position toward the protruding portion and inserted into the through-hole of the protruding portion to retain a state in which the male joining member is inserted into the female joining member.

In accordance with this configuration, since the wedge member as the joined state retaining member can retain the state in which the male joining member is inserted into the female joining member, the state in which the segments are joined together can be retained more stably, with a simple configuration.

In accordance with this configuration, preferably, the mold further comprises a segment joining/guide mechanism for positioning the protruding portion of the male joining member when the protruding portion is inserted into the recess or the opening of the female joining member. This facilitates positioning when the protruding portion of the male joining member is inserted into the recess or the opening of the female joining member.

The specific configuration of segment joining/guide mechanism is not particularly limited. For example, preferably, the segment joining/guide mechanism includes: a female guide member provided on each of the side surfaces of the first segment in a location closer to the obverse surface than the male joining member, the female guide member having a cutout portion or a recess portion extending in a direction from the obverse surface toward the reverse surface and including a portion whose dimension decreases gradually in the direction from the obverse surface toward the reverse surface; and a male guide member provided on each of the side surfaces of the second segment in a location closer to the obverse surface than the female joining member, the male guide member including an insertion portion inserted into the cutout portion or the recess potion of the female guide member.

In accordance with this configuration, the first segment which requires precise position adjustment in assembling is provided with the female guide member, and the second segment fastened firstly to the annular retaining member is provided with the male guide member. Therefore, when the first segment is lifted in the 12 o'clock direction and fitted, positioning is performed with precise adjustment. The first segment is provided with the male joining member and the female guide member, while the second segment is provided with the female joining member and the male guide member, and thus, a male-female relation is reversed between the joining member and the guide member. Therefore, the male and female guide members serve as auxiliary segment joining/retaining mechanism, and the segments can be joined together more stably.

In the above configuration, preferably, the eave portion of the second segment has a tip end having a folded edge portion folded back in a direction from the obverse surface toward the reverse surface; and the segment joining/retaining mechanism includes a clamp member for clamping the folded edge portion of the second segment via the side surface of the first segment in a state where the obverse surface of the first segment and the obverse surface of the second segment are positioned form a continuous surface.

In accordance with this configuration, since the segment joining/retaining mechanism further includes the clamp member, the state in which the segments are joined together can be maintained stably.

The specific configuration of the annular retaining member of the mold having the above configuration is not particularly limited. For example, preferably, the first segment includes three first segments and the second segment includes three second segments; the annular retaining members have an oval shape; and the first segments and the second segments are assembled such that the first segment and the second segment are joined together alternately, to construct a single cylindrical shape in an oval shape conforming to the oval shape of the annular retaining members. In accordance with this configuration, the mold conforming in shape to an OPB is attained.

In the mold having the above configuration, preferably each of the obverse surface of the first segment and the obverse surface of the second segment has a plurality of recesses filled with a frame material of the composite material structure. This allows stringers used for manufacturing the OPB to be fitted into the recesses on the obverse surfaces for positioning, the mold of the present invention can be suitably used as the mold of the OPB.

The above and further objects, features and advantages of the present invention will more fully be apparent from the following detailed description of preferred embodiments with accompanying drawings.

Advantageous Effects of the Invention

As should be appreciated from the above, in accordance with the present invention, in a mold used for manufacturing a composite material structure, such as a fuselage of an aircraft, the mold having a substantially cylindrical shape and being dividable into a plurality of segments, segments are assembled in a cylindrical shape with high position accuracy and in a more simplified manner.

Figure 1:
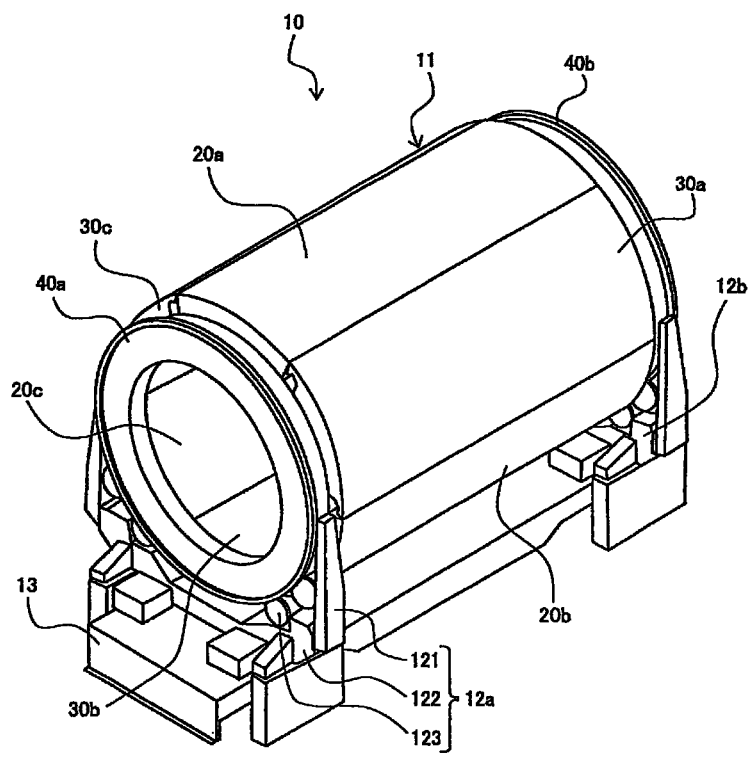
FIG. 1 is a perspective view showing an example of the overall configuration of a mold used for manufacturing a composite material structure according to an embodiment of the present invention.

REFERENCE SIGNS LISTS 10 mold
11 mandrel (cylindrical member)
20, 20a to 20c first segment
30, 30a to 30c second segment
37 eave portion
40a, 40b support ring (annular retaining member)
41 female fastener member (annular fastening/retaining mechanism)
42 female guide member (annular fastening/guide mechanism)
46 fastening wedge member (annular fastening/retaining mechanism, fastened state retaining member)
251, 351 male fastener member (annular fastening/retaining mechanism)
252, 352 male guide member (annular fastening/guide mechanism)
261 male joining member (segment joining/retaining mechanism)
262 female guide member (segment joining/guide mechanism)
264 joining wedge member (segment joining/retaining mechanism, joined state retaining member)
271 support edge portion
265 clamp member
361 female joining member (segment joining/retaining mechanism)
362 male guide member (segment joining/guide mechanism)
371 folded edge portion

DESCRIPTION OF EMBODIMENTS

Hereinafter, preferred embodiments of the present invention will be described with reference to the drawings. Throughout the drawings, the same or corresponding components are designated by the same reference numerals and repetitive description thereof will not be given.

[Overall Configuration of Mold]

First of all, the overall configuration of a mold used for manufacturing a composite material structure according to the present embodiment (hereinafter referred to as mold) will be described with reference to FIG. 1. FIG. 1 is a perspective view showing an example of the overall configuration of a mold 10 according to the embodiment of the present invention.

As shown in FIG. 1, the mold 10 of the present embodiment comprises at least a mandrel 11 and a pair of support rings 40a, 40b located at both ends thereof. The mandrel 11 includes six segments 20a, 30a, 20b, 30b, 20c, and 30c which are joined together at side surfaces thereof. The both ends of the mandrel 11 are supported by the support rings 40a, 40b, respectively. This allows the six segments 20a to 20c and 30a to 30c maintain a cylindrical shape.

As described later, channel-shaped concave portions are formed on the obverse surfaces of the segments 20a to 20c and 30a to 30c, to attach stringers thereto, respectively. However, in FIG. 1, the channel-shaped concave portions are not shown, to clearly show the overall configuration. The configuration of the segments 20a to 20c and 30a to 30c, and the support rings 40a, 40b will be described specifically later.

The support rings 40a, 40b are rotatably supported by cradles 12a, 12b, respectively such that they extend in an upright position. In the present embodiment, the cradle 12a for supporting the support ring 40a includes a pair of arm sections 121, a cradle body 122 and a plurality of support rollers 123 (four in FIG. 1). The pair of arm sections 121 are provided to extend in an upright position and sandwich the outer periphery of the support ring 40a in the upright position. The cradle body 122 is positioned under the support ring 40a and supports the arm sections 121 at both ends thereof. The support rollers 123 are placed between the cradle body 122 and the support ring 40a (40b) such that the support ring 40a (40b) is rotatable by an external force. Since the cradle 12b for supporting the support ring 40b has the same configuration, description thereof will not be given.

A carriage 13 is configured to carry the cradles 12a, 12b, the support rings 40a, 40b, and the mandrel 11. In the present embodiment, the carriage 13 has a rectangular flat shape, and is provided with a plurality of wheels on the lower surface of the carriage 13, although not shown in FIG. 1. The carriage 13 is able to carry the cradles 12a, 12b, the support rings 40a, 40b, and the mandrel 11, with the mold 10 placed thereon. In the present embodiment, the carriage 13 has an upper surface having a greater area to correspond to the dimension (axial length of a cylinder and a diameter of a cylinder) of the mandrel 11. In the state of FIG. 1, the cradles 12a, 12b are not in contact with the carriage 13 and stand for themselves on a floor surface such that the height of the support rings 40a, 40b which oppose to each other is horizontally adjustable.

The specific configurations of the cradles 12a, 12b and the carriage 13 are not limited to those disclosed in the present embodiment, and various configurations may be used so long as their advantages, functions and the like can be achieved.

[Configuration of Segment]

Figure 2A:
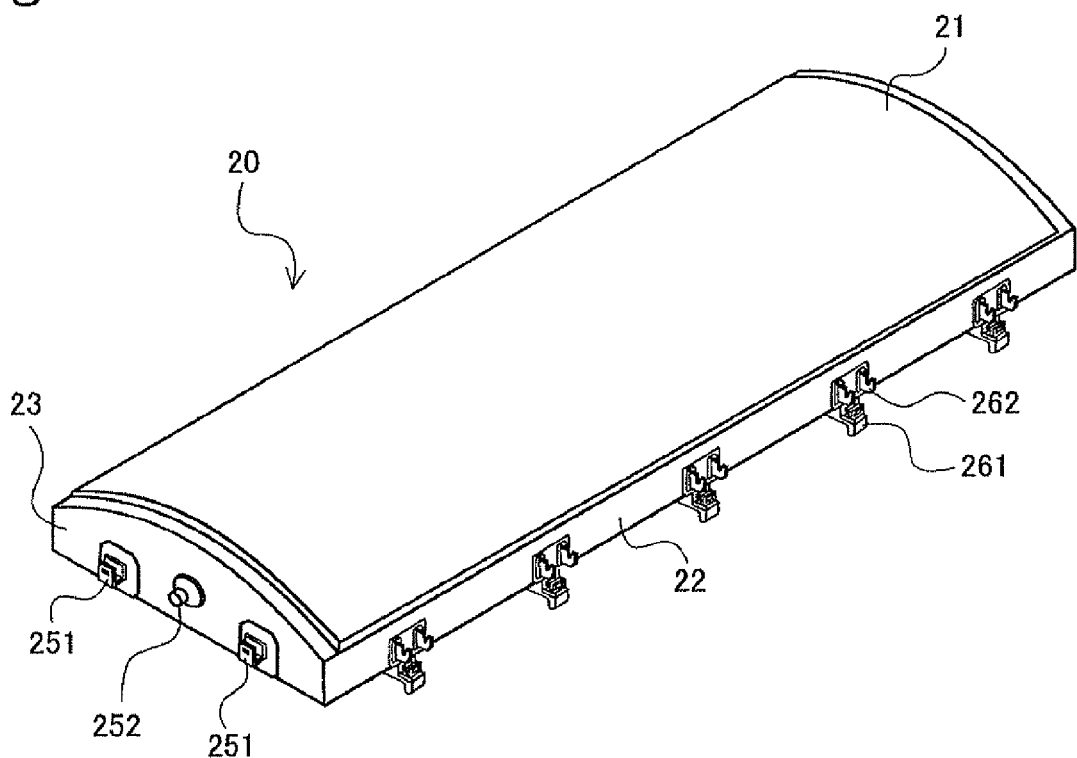
FIG. 2A is a perspective view showing the configuration of a first segment constituting a cylindrical structure of the mold used for manufacturing the composite material structure of FIG. 1.
Figure 2B:
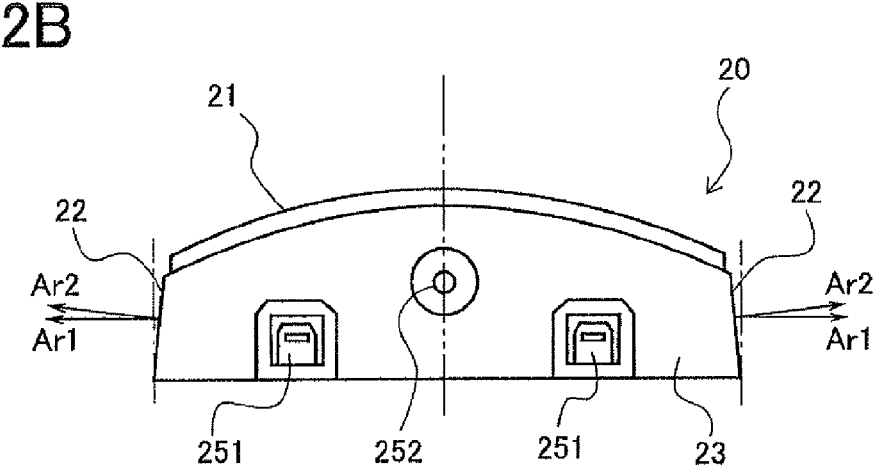
FIG. 2B is a plan view of the first segment when viewed from an end portion thereof.
Figure 3A:
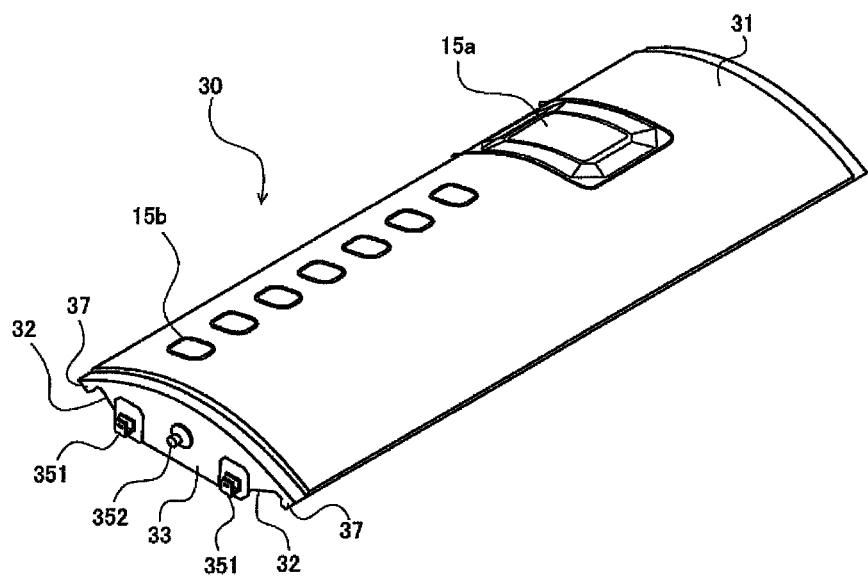
FIG. 3A is a perspective view showing the configuration of a second segment constituting a cylindrical structure of the mold used for manufacturing the composite material structure of FIG. 1.

Next, the six segments 20a to 20c and 30a to 30c constituting the mandrel 11 will be described with reference to FIGS. 2A and 2B, and FIGS. 3A and 3B. FIG. 2A is a perspective view showing the configuration of a first segment constituting a cylindrical structure of the mold used for manufacturing the composite material structure of FIG. 1, and FIG. 2B is a plan view of the first segment when viewed from an end portion thereof. FIG. 3A is a perspective view showing the configuration of a second segment constituting the cylindrical structure of the mold used for manufacturing the composite material structure of FIG. 1, and FIG. 3B is a plan view of the second segment when viewed from an end portion thereof.

Figure 3B:
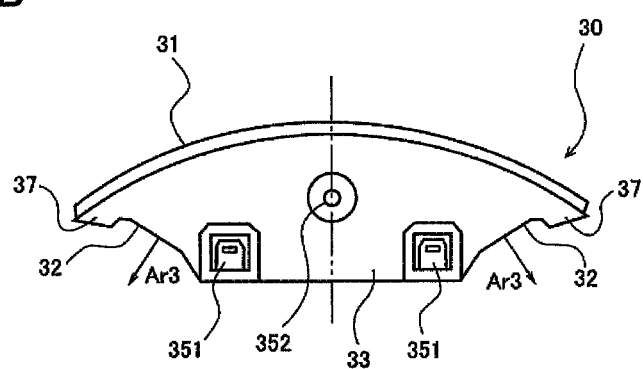
FIG. 3B is a plan view of the second segment when viewed from an end portion thereof.

In the present embodiment, the six segments 20a to 20e and 30a to 30c constituting the mandrel 11 are classified into the first segments 20a to 20c of FIGS. 2A and 2B, and the second segments 30a to 30c of FIGS. 3A and 3B, depending on their shape. In description below with reference to FIGS. 2A and 2B, and FIGS. 3A and 3B, the first segments 20a to 20c having the same shape are collectively referred to as "first segment 20," while the second segments 30a to 30c having the same shape are collectively referred to as "second segment 30."

As shown in FIG. 2A, the first segment 20 entirely has a rectangular plate shape, an obverse surface 21 thereof is a convex-like curved surface (convex-shaped surface or convex-curved surface), and side surfaces 22 face a horizontal direction or a direction which is inclined upwardly with respect to the horizontal direction, in a state in which the first segment 20 is placed horizontally with the obverse surface 21 being on an upper side. In the present embodiment, for example, as shown in FIG. 2B, a normal-line direction of the side surface 22 faces the direction which is inclined upwardly with respect to the horizontal direction.

As described later, in the present embodiment, when the mandrel 11 is assembled in a cylindrical shape, the second segments 30 are firstly fastened to the support rings 40a, 40b, and then the first segments 20 are each fitted between the second segments 30 in a direction from below to above and fastened thereto. Therefore, to allow the first segments 20 to be fitted without any interference, it is required that the normal-line direction of the side surfaces 22 of the first segment 20 face the horizontal direction (arrow Ar1 direction of FIG. 2B). In other words, in the state where the first segment 20 is placed horizontally, the side surface 22 extends in a vertical direction (direction along one-dotted line of FIG. 2B).

After the one piece barrel (OPB) is molded using the mold 10 including the mandrel 11, the OPB is removed from the mold 10. The OPB is removed from the mold 10 by disassembling the mandrel 11. The mandrel 11 is disassembled in a reversed order of assembling of the mandrel 11 as will be described later. Therefore, the first segment 20 is drawn from between the second segments 30.

To this end, as shown in FIG. 2B, the normal-line direction of the side surfaces 22 of the first segment 20 is inclined in the upward direction toward the obverse surface 21 (arrow Ar direction of FIG. 2B). The fact that the normal-line direction of the side surfaces 22 of the first segment 20 is inclined to face the upward direction means that the side surfaces 22 are each inclined in the upward direction. In other words, the side surfaces 22 are inclined such that an edge of the side surface 22 on the reverse side is outward relative to an edge thereof on the obverse side. The inclined side surfaces 22 form "draft" in the side surfaces 22 of the first segment 20. Therefore, the first segment 20 is drawn easily from between the second segments 30, and thus, the mandrel 11 is disassembled easily.

The inclination angle (draft angle) of the side surface 22 is not particularly limited. A suitable angle is set according to specific shapes or dimensions, etc., of the mandrel 11 and the mold 10. For example, in the present embodiment, the inclination angle (draft angle) of the side surface 22 is set to 8 to 12 degrees, preferably about 10 degrees. The side surfaces 22 facing each other may be inclined at an equal angle or different angles.

As shown in FIGS. 2A and 2B, on an end surface 23 of the first segment 20, there are provided male fastener members 251 for fastening the end surface 23 to a fastening surface (described later) of the support ring 40a (40b), and a male guide member 252 used for positioning fastener members when the first segment 20 is fastened. The male fastener members 251, female fastener members, and a fastened state retaining member (described later), which are provided on the fastening surface of the support ring 40a (40b), constitute an annular fastening/retaining mechanism. In addition, the male guide member 252, and a female guide member (described later) provided on the fastening surface of the support ring 40a (40b) constitute an annular fastening/guide mechanism.

The two male fastener members 251 are provided on the end surface 23. The male guide member 252 is positioned between the male fastener members 251. As shown in FIG. 2B, the male guide member 252 is positioned on a center line (two-dotted line in FIG. 2B) dividing the end surface 23 in a longitudinal direction in FIG. 2B (vertical direction in the state where the first segment 20 is placed horizontally). Therefore, the male fastener members 251 are positioned at an equal distance from the center line. The male guide member 252 is positioned closer to the obverse surface 21 than the male fastener member 251. This is because the male guide member 252 and the female guide member constituting the annular fastening/guide mechanism are brought into contact with each other first to position the fastener members constituting the annular fastening/retaining mechanism, when the first segment 20 is lifted up with the obverse surface 21 being on the upper side and fastened to the support ring 40a (40b).

As shown in FIG. 2A, on each of the side surfaces 22 of the first segment 20, there are provided a plurality of (five in FIG. 2A) male joining members 261, a plurality of outer peripheral female guide members 262, joining wedge members and inner peripheral male guide members, which are not shown in FIG. 2A. The male joining members 261 are positioned on the reverse side of the first segment 20, while the outer peripheral female guide members 262 are positioned adjacent to the male joining members 261 and closer to the obverse surface 21 than the male joining members 261. Joining wedge members are provided on the side surface 22 inward relative to the male joining members 261, and protrude outward of the side surface 22 when the first segment 20 is joined to the second segment 30, as described later. The inner peripheral male guide members are provided integrally with the underside of the male joining members 261, although not shown in FIG. 2A.

The male joining members 261, the joining wedge members, and the female joining members (described later) provided on the side surface of the second segment 30 constitute a segment joining/retaining mechanism. The outer peripheral female guide members 262 and outer peripheral male guide members (described later) provided on the side surface of the second segment 30 constitute a segment joining/guide mechanism. In the same manner, the inner peripheral male guide members and inner peripheral female guide members (described later) provided on the side surface of the second segment 30 constitute a segment joining/guide mechanism. In FIG. 2B, to make clear the positional relationship between the side surfaces 22, the male joining members 261, the outer peripheral female guide members 262, the inner peripheral male guide members, and the joining wedge members are not shown.

The male joining member 261 and the outer peripheral female guide member 262 have a positional relationship in which the outer peripheral female guide member 262 is located at the upper side (obverse surface 21 side) and the male joining member 261 is located at the lower side (reverse surface side) in the longitudinal direction in FIG. 2A (vertical direction in the state where the first segment 20 is placed horizontally). This is because, as in the case of the annular fastening/retaining mechanism, the segment joining/guide mechanism positions the segment joining/retaining mechanism, when the first segment 20 is lifted up, is inserted between the second segments 30, and they are joined together.

As will be described later, the inner peripheral male guide member is positioned under (on reverse surface side of) the male joining member 261 in FIG. 2A. It is important to position the side surfaces of the segments 20, 30 when they are joined together, because the mandrel 11 of a substantially cylindrical shape defined by the first segments 20 and the second segments 30 is required to have a smooth outer peripheral surface which is a circumferential surface. That is, when the side surfaces of the segments 20, 30 are joined together, the outer peripheral female guide members 262 and the outer peripheral male guide members perform positioning at the outer peripheral side, while the inner peripheral male guide members and the inner peripheral female guide members perform positioning at the inner peripheral side. This makes it possible to form the smooth circumferential surface while lessening unevenness on the outer peripheral surface of the mandrel 11.

Specific configuration, fastening method, joining method and guide method of the annular fastening/retaining mechanism, the annular fastening/guide mechanism, the segment joining/retaining mechanism, and the segment joining/guide mechanism, will be described later along with an assembling method of the mandrel 11. In the present embodiment, as described later, a clamp member provided on the side surface 22 is included in the segment joining/retaining mechanism. The clamp member will be described later along with the assembling method of the mandrel 11. The obverse surface 21 of the first segment 20 is configured to allow the stringer to be attached thereto, although not shown in FIGS. 2A and 28.

As shown in FIG. 3A, the second segment 30 entirely has a rectangular plate shape, an obverse surface 31 thereof is a convex-like curved surface (convex-shaped surface or convex-curved surface), and side surfaces 32 face a direction which is inclined downwardly with respect to the horizontal direction, in a state in which the second segment 30 is placed horizontally with the obverse surface 31 being on an upper side. That is, the side surfaces 32 are inclined such that the width of the second segment 30 increases from the reverse side toward the obverse surface 31.

As described later, in the present embodiment, when the mandrel 11 is assembled in a cylindrical shape, the second segments 30 are fastened to the support rings 40a, 40b, and then the first segment 20 is fitted between the second segments 30. Therefore, the second segment 30 fastened first preferably has a smaller reverse side area so that fitting of the first segment 20 is not precluded. To this end, the normal-line direction of the side surface 32 of the second segment 30 faces a downward direction (arrow Ar3 direction of FIG. 3B), i.e., the side surface 32 is inclined in the downward direction.

Each of the side surfaces 32 of the second segment 30 has a shape in which an edge portion connected to the obverse surface 31 has an eave portion 37 protruding outward than the corresponding side surface 32. Therefore, as shown in FIGS. 3A and 3B, when the second segment 30 is seen from the obverse surface 31, the side surface 32 facing downward is completely hidden by the cave portion 37. On the side surface 32 under the cave portion 37, a female joining member (described later) constituting the segment joining/retaining mechanism, and the outer peripheral male guide member and the inner peripheral female guide member constituting the segment joining/guide mechanism are provided. In FIG. 3B, to make clear the positional relationship between the side surfaces 32, the female joining members, the outer peripheral male guide members, and the inner peripheral female guide members are not shown. These will be described along with the assembling method of the mandrel 11.

The degree to which the side surface 32 is inclined downward, and the degree to which the eave portion 37 protrudes outward are not particularly limited. They are suitably set based on the specific configuration of the mandrel 11, the specific configuration of the second segment 30, or the specific configuration of the first segment 20 joined to the second segment 30.

Like the end surface 23 of the first segment 20, on an end surface 33 of the second segment 30, two male fastener members 351 for fastening the end surface 33 to the fastening surface of the support ring 40a (40b) and one male guide member 352 are provided to have the same positional relationship as that between the male fastener members 251 and the male guide member 252. Like the male fastener members 251, the male fastener members 351 constitute the annular fastening/retaining mechanism. Like the male guide member 252, the male guide members 352 constitute the annular fastening/guide mechanism.

As shown in FIG. 3A, the second segment 30 has a door frame portion 15a and window frame portions 15b. The door frame portion 15a corresponds to a door in the OPB formed using the mold 10 of the present embodiment, while the window frame portions 15b correspond to windows in the OPB. The door frame portion 15a and the window frame portions 15b are concave-convex portions used for cutting and perforation in a trimming process. Although in the present embodiment, the door frame portion 15a and the window frame portions 15b are formed on the obverse surface 31 of the second segment 30, the present invention is not limited to this. The door frame portion 15a and the window frame portions 15b may be formed on the obverse surface 21 of the first segment 20 or on both of the first segment 20 and the second segment 30. Although not shown, the stringer is attachable on the obverse surface 31 of the second segment 30.

[Configuration of Mandrel and Support Ring]

In the present embodiment, the first segment 20 and the second segment 30 as described above are joined alternately together, and are combined in an annular shape such that the obverse surface 21 and the obverse surface 31 are on the outer side, thereby forming the single cylindrical mandrel 11. The specific configuration of the mandrel 11 and the support rings 40a, 40b retaining the mandrel 11 in a cylindrical shape will be described with reference to FIGS. 4 and 5.

Figure 4:
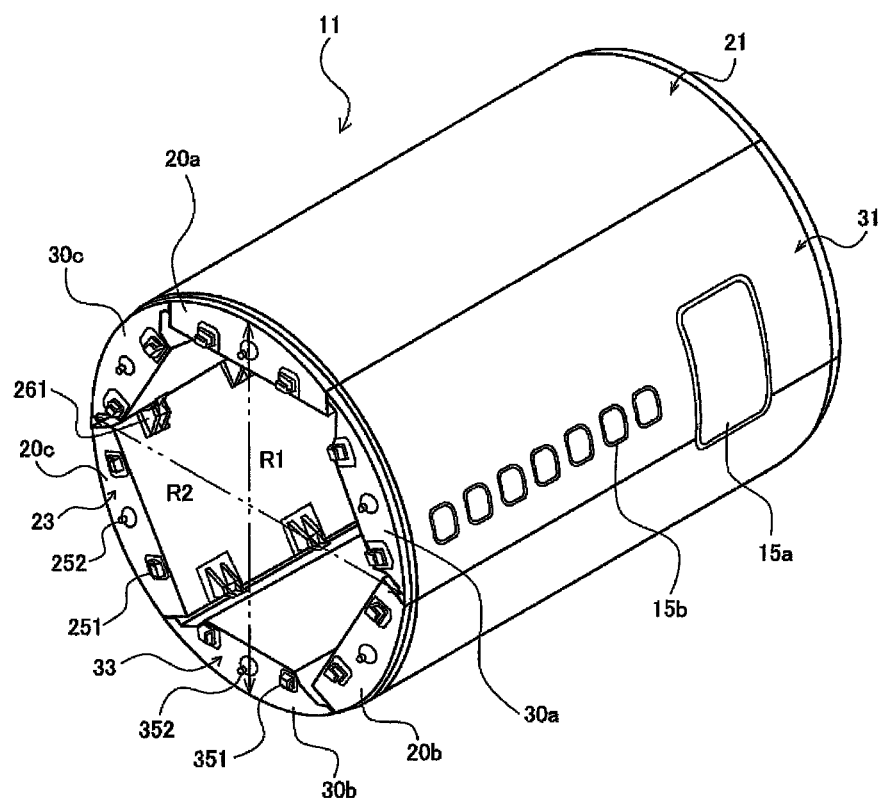
FIG. 4 is a perspective view showing an example of the configuration of a mandrel constituting the mold used for manufacturing the composite material structure of FIG. 1.
Figure 5:
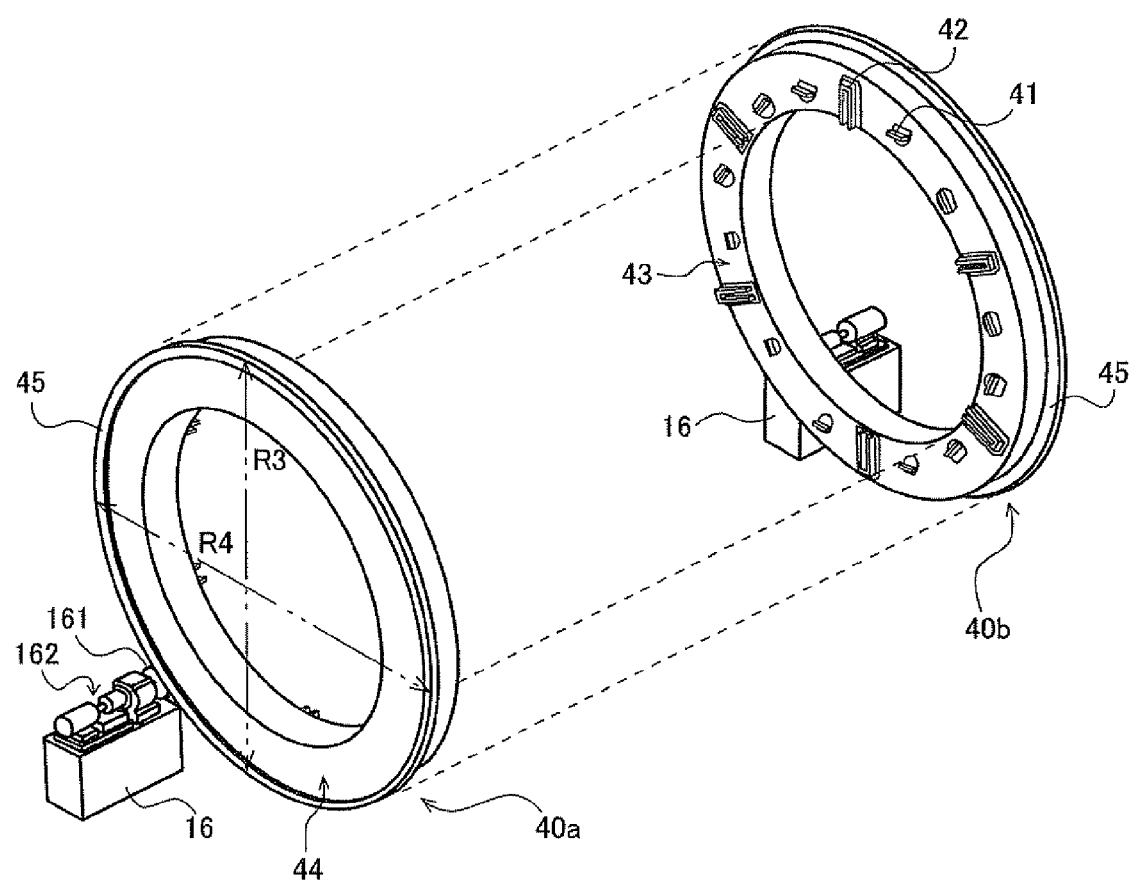
FIG. 5 is a perspective view showing an example of the configuration of a pair of support rings for supporting the mandrel of FIG. 4 by both ends thereof.

FIG. 4 is a perspective view showing an example of the configuration of the mandrel 11 constituting the mold 10 of FIG. 1. FIG. 5 is a perspective view showing an example of the configuration of the support rings 40a, 40b for supporting the mandrel 11 by both ends thereof.

As shown in FIG. 4, the mandrel 11 of the present embodiment is constructed as a single cylindrical member in such a manner that the first segment 20a, the second segment 30a, the first segment 20b, the second segment 30b, the first segment 20c and the second segment 30c are joined together in this order by the segment joining/retaining mechanisms on the side surfaces 22 and the side surfaces 32. In FIG. 4, among the segment joining/retaining mechanisms, a part of the male joining member 261 provided on the first segment 20c are shown.

On each of the end surfaces 23 of the first segments 20a, 20b, and 20c, which are the end surfaces of the mandrel 11, the male fastener members 251 constituting the annular fastening/retaining mechanism and the male guide member 252 constituting the annular fastening/guide mechanism are provided, while on each of the end surfaces 33 of the second segments 30a, 30b, and 30c, which are the end surfaces of the mandrel 11, the male fastener members 351 constituting the annular fastening/retaining mechanism and the male guide member 352 constituting the annular fastening/guide mechanism are provided.

Furthermore, in the present embodiment, on the obverse surface 31 of the second segment 30a, the door frame portion 15a and the window frame portions 15b are formed. Although not shown in FIG. 4, on the obverse surface 21 of the first segment 20c facing the second segment 30a, the window frame portions 15b are formed.

As shown in FIG. 4, for example, the first segment 20c, and the second segments 30b and 30c have flat reverse surfaces. But, the specific configuration of the first segments 20a to 20c, and the second segments 30a to 30c is not limited to this. The first segments 20a to 20c, and the second segments 30a to 30c may be configured not to have flat reverse surfaces, but an internal configuration such as a frame structure forming the segments 20, and 30 may be exposed. Since the outer peripheral surface of the mandrel 11 is preferably a surface as smooth as possible, the obverse surface 21 and the obverse surface 31 forming the outer peripheral surface are required to be smooth, and the reverse sides of the mandrel 11 need not be flat surfaces.

In the present embodiment, the cross-sectional shape of the mandrel 11, i.e., the shape of the end surface of the mandrel 11 which is defined by the end surfaces 23 of the first segments 20a to 20c and the end surfaces 33 of the second segments 30a to 30c, is not a perfect circle shape, but is an oval shape in which a diameter R1 (arrows of two-dotted line of FIG. 4) connecting a center of the first segment 20a to a center of the second segment 30b is long, and a diameter R2 (arrows of two-dotted line of FIG. 4) connecting a joining portion of the second segment 30a and the first segment 20b to a joining portion of the first segment 20c and the second segment 30c is short. This is because the cross-sectional shape of the OPB which is the composite material structure manufactured using the mold 10 of the present embodiment is an oval shape. Therefore, the cross-sectional shape of the mandrel 11 is not limited to the oval shape, but may be a perfect circle shape conforming in shape to the composite material structure manufactured, or may be an oval shape in which R1 is longer than R2.

Since the cross-sectional shape of the mandrel 11 is the oval shape, the first segments 20a to 20c and the second segments 30a to 30c are different in shape. If the cross-sectional shape (shape of the end surface) of the mandrel 11 is a perfect circle shape, the obverse surfaces 21 of the first segments 20a to 20c have an equal curvature, and therefore the first segments 20a to 20c have the same shape. In the same manner, the second segments 30a to 30c have the same shape. When the cross-sectional shape of the mandrel 11 is the oval shape, as shown in FIG. 4, for example, the first segment 20a and the second segment 30b located to correspond to the diameter R1 which is a long side are different in curvature of the obverse surface 21 or curvature of the obverse surface 31, from the first segments 20b, 20c or the second segments 30a, 30c, they cannot have the same shape.

As shown in FIG. 5, the support rings 40a, 40b for supporting the mandrel 11 configured as described above have an oval annular shape. Opposing surfaces of the support rings 40a, 40b are fastening surfaces 43 for fastening the end surfaces of the mandrel 11. On each of the fastening surfaces 43, a plurality of female fastener members 41 and a plurality of female guide members 42 are provided. The positions of the female fastener members 41 and the female guide members 42 on the fastening surface 43 correspond to the shape of the end surface of the oval shape of the mandrel 11. Specifically, the support ring 40a (40b) of FIG. 5 has an oval shape in which a diameter R3 is longer and a diameter R4 is shorter (R3 and R4: arrows of two-dotted line of FIG. 5). Therefore, the mandrel 11 having the oval cross-sectional shape can be fastened and supported to the fastening surface 43.

When the support rings 40a, 40b have an oval shape, the positions of the first segments 20a to 20c fastened to the fastening surface 43 are different from the positions of the second segments 30a to 30c fastened to the fastening surface 43. Therefore, the positions of the first segments 20a to 20c fastened to the fastening surface 43 are connecting portions of the fastening surface 43 and the end surfaces 23, and therefore are referred to as "first connecting portions." Also, the positions of the second segments 30a to 30c fastened to the fastening surface 43 are referred to as "second connecting portions." The first connecting portions and the second connecting portions are set along a circumferential direction of the fastening surface of the support ring 40a (40b) such that the first connecting portion and the second connecting portion are arranged alternately. At each of the connecting portions, the female fastener member 41 and the female guide member 42 are provided.

The female fastener members 41 are members into the male fastener members 251 of the first segments 20a to 20c constituting the mandrel 11 or the male fastener members 351 of the second segments 30a to 30c constituting the mandrel 11 are inserted to fasten the first segments 20a to 20c or the second segments 30a to 30c to the fastening surface 43 of the support ring 40a (40b). The female fastener members 41, and the male fastener members 251, 351, constitute the annular fastening/retaining mechanism. Although not shown in FIG. 5, fastening wedge members as a fastened state retaining member for retaining the above fastened state are provided on the fastening surface 43.

The male guide members 252 of the first segments 20a to 20c and the male guide members 352 of the second segments 30a to 30c are inserted into the female guide members 42, to guide the male fastener members 251, 351 to be inserted into the female fastener members 41. The female guide members 42, and the male guide members 252, 352 constitute the annular fastening/guide mechanism. As described later, the female guide member 42 is a pair of rail-like members extending radially from a center side toward outside of the support ring 40a (40b). The inner end portion of the support ring 40a (40b) is open between the rails, while the outer end portion thereof is closed between the rails. The male guide member 252 (352) is inserted into a recess portion between the rails to serve as the annular fastening/guide mechanism.

The positions of the female fastener members 41 on the fastening surface 43 correspond to the male fastener members 251, 351 provided on the end surfaces 23 of the first segments 20a to 20c and on the end surfaces 33 of the second segments 30a to 30c. For example, the male fastener members 251 of each of the first segments 20a to 20c are positioned at an equal distance from the male guide member 252 positioned on the center line of the end surface 23. Therefore, on the fastening surface 43, two female fastener members 41 are positioned at an equal distance from the female guide member 42 on the center line.

Since the mandrel 11 is composed of six segments 20a to 20c and 30a to 30c in the present embodiment, six female guide members 42 are provided at substantially equal intervals on the fastening surface 43 and a pair of female fastener members 41 are provided to be oriented in the same direction such that they sandwich the female guide member 42 between them.

The support ring 40a (40b) is provided with a flanged rotary gear section 45 on the outer periphery of a surface (outer surface 44) which is on an opposite side of the fastening surface 43. The rotary gear section 45 is in mesh with a drive gear 161 of a ring rotation drive section 16. A drive source 162 of the ring rotation drive section 16 rotates the drive gear 161, therefore the support ring 40a (40b) rotates. As described later, the mandrel 11 is constructed by assembling the six segments 20a to 20c and 30a to 30c. During assembling of the mandrel 11, the support rings 40a, 40b are rotated, so that the six segments 20a to 20c and 30a to 30c are lifted up and fastened to the support rings 40a, 40b with the same motion, instead of fastening the six segments 20a to 20c and 30a to 30c to the support rings 40a, 40b with a different motion. The specific configurations of the rotary gear section 45 and the ring rotation drive section 16 are not particularly limited, but known configurations may be suitably used.

[Assembling Method of Mandrel, Fastening of Second Segment]

Next, a description will be given of the assembling method of the mandrel 11 by fastening the six segments 20a to 20c and 30a to 30c to the support rings 40a, 40b one by one. In the assembling method of the mandrel 11, the second segments 30a to 30c are fastened to the support rings 40a, 40b one by one, and then the first segments 20a to 20c are fastened to the support rings 40a, 40b one by one. First of all, a fastening method and fastening work of the second segments 30a to 30c will be described along with the specific configurations of the annular fastening/retaining mechanism and the annular fastening/guide mechanism, with reference to FIGS. 6 to 13.

Figure 6:
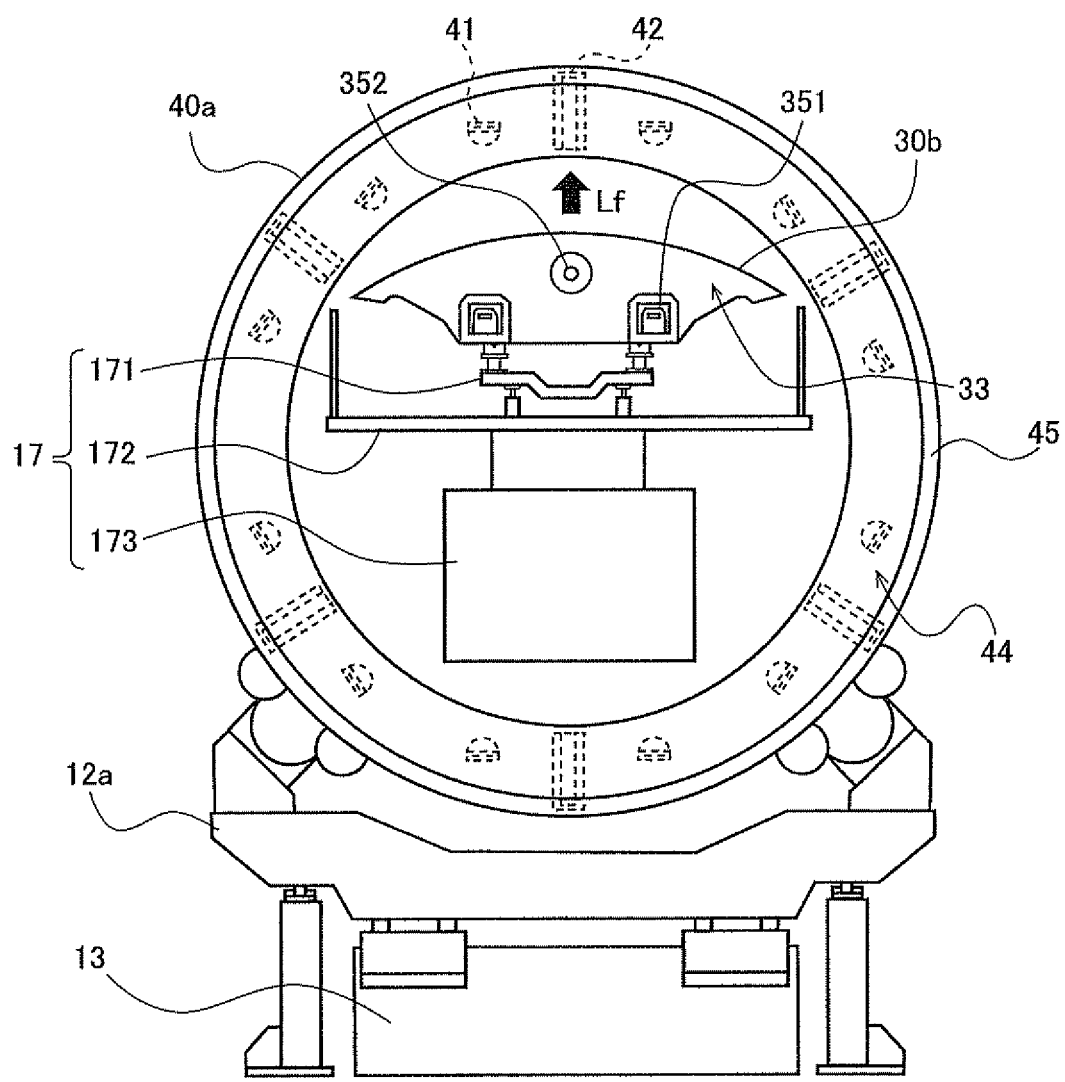
FIG. 6 is a schematic view showing a state in which the second segment of a first order is placed on a jack section to lift up the second segment in a 12 o'clock direction (vertically upward direction) and to fasten it to the support rings, among steps for assembling the mold used for manufacturing the composite material structure of FIG. 1.
Figure 7A:
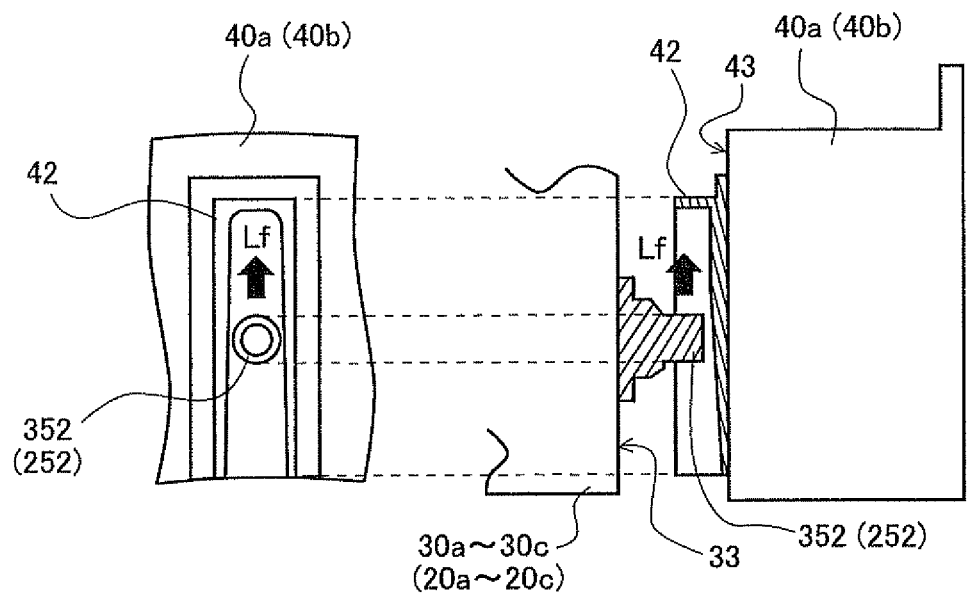
FIGS. 7A and 7B are schematic views showing an example of the configuration of an annular fastening/guide mechanism and a fastening/guiding operation in the step of lifting up the second segment of FIG. 6 and fastening it to the support rings.
Figure 7B:
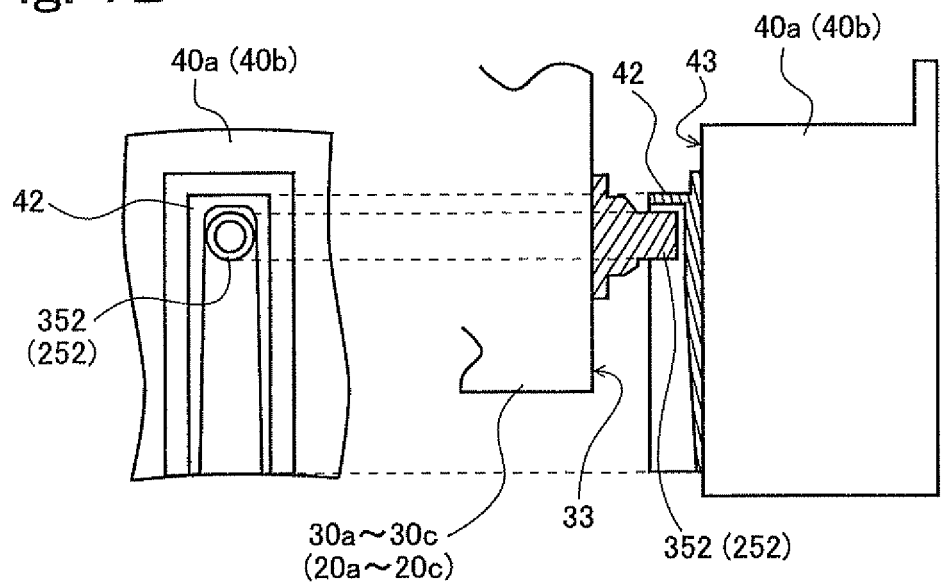
Figure 8A:
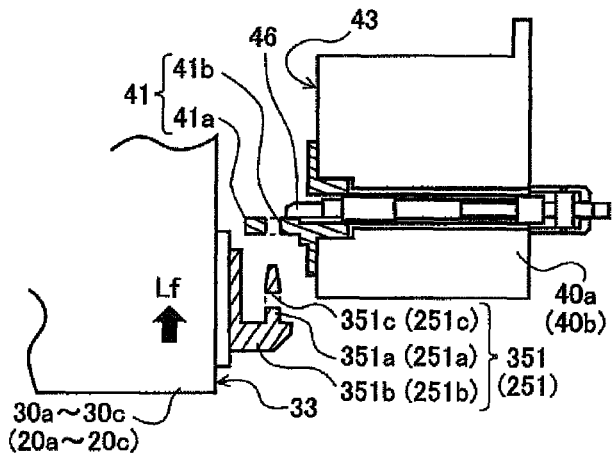
FIGS. 8A to 8C are schematic views showing an example of the configuration of an annular fastening/retaining mechanism and a fastening/retaining operation in the step of lifting up the second segment of FIG. 6 and fastening it to the support rings.
Figure 8B:
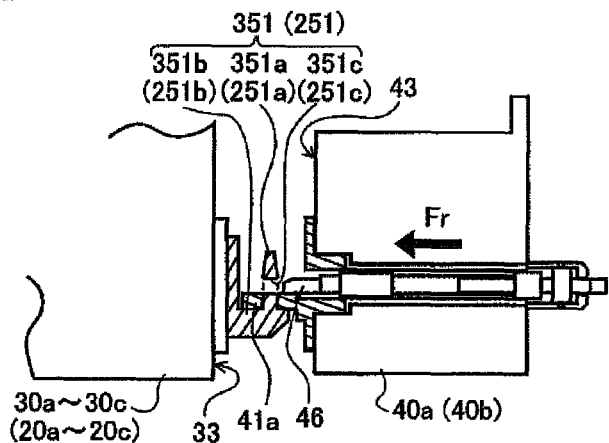
Figure 8C:
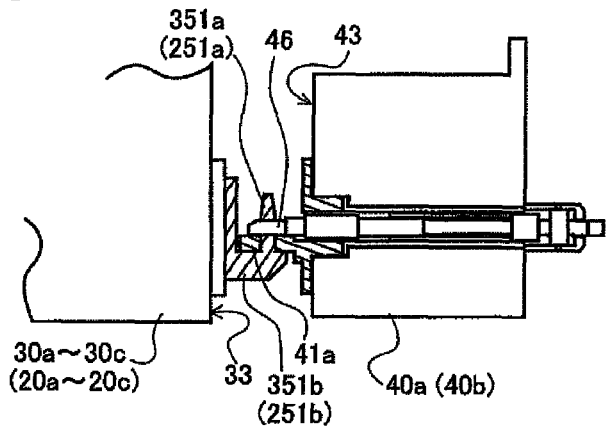
Figure 9:
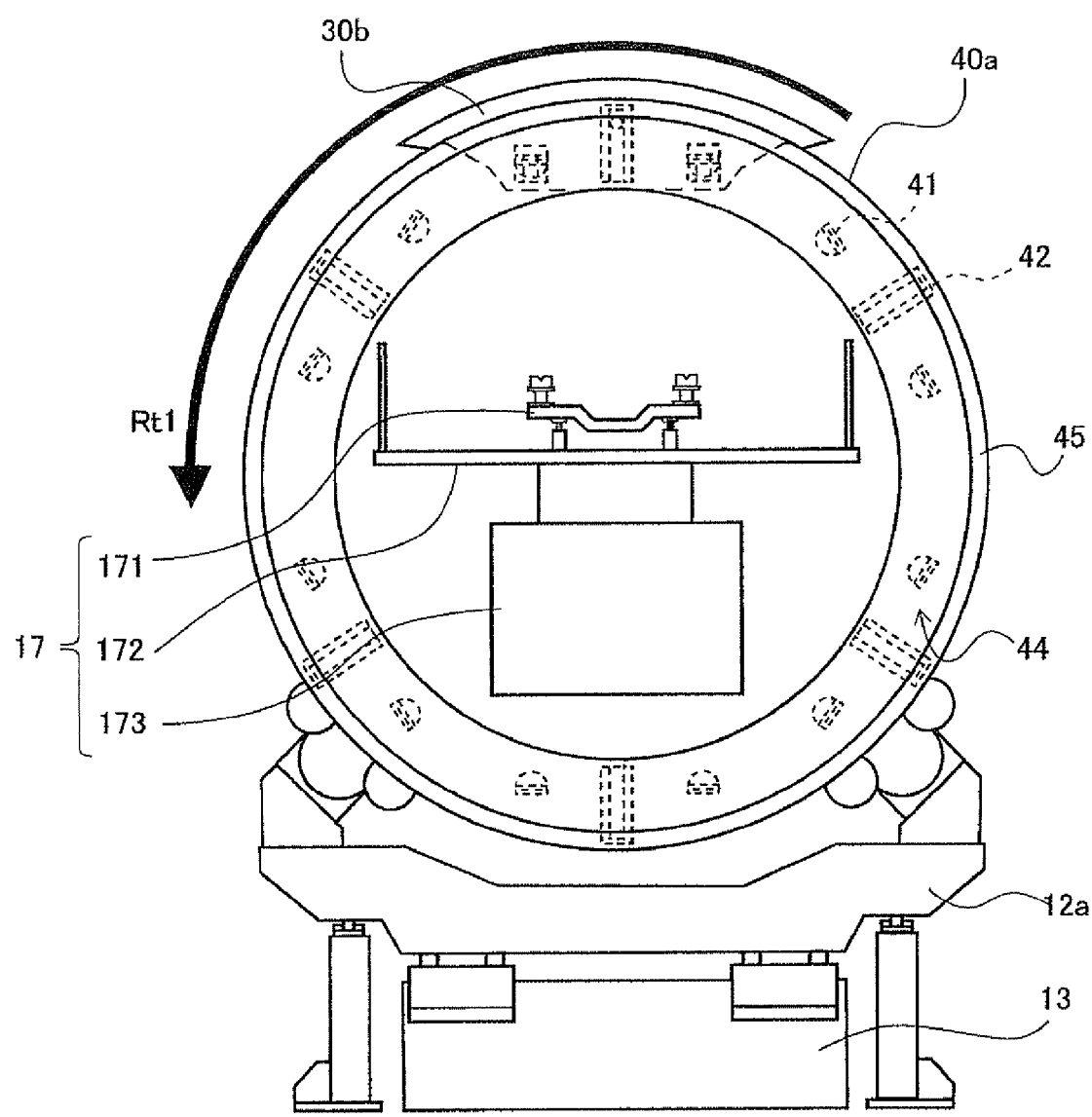
FIG. 9 is a schematic view showing a state in which the second segment of a first order is fastened to the support rings, among steps for assembling the mold used for manufacturing the composite material structure of FIG. 1.

FIG. 6 is a schematic view showing a state in which the second segment 30b of a first order is placed on a jack section to lift the second segment 30b in a 12 o'clock direction (upward direction) and to fasten it to the support ring 40a (and support ring 40b). FIGS. 7A and 7B are schematic views showing an example of the configuration of the annular fastening/guide mechanism and a fastening/guide operation in the step of lifting up one of the second segment 30a to 30c and fastening it to the support ring 40a. FIGS. 8A to 8C are schematic views showing an example of the configuration of an annular fastening/retaining mechanism and a fastening/retaining operation in the step of lifting up one of the second segments 30a to 30c and fastening it to the support ring 40a, FIG. 9 is a schematic view showing a state in which the second segment 30a of a first order is fastened to the support ring 40a. FIGS. 10 to 13 are schematic views showing a placed state or a fastened state when the second segment 30c of a second order or the second segment 30a of a third order is fastened to the support ring 40a.

In schematic views showing the state in which the segments 20a to 20c and 30a to 30c are fastened to the support ring 40a, including FIG. 6, a part of the configuration of the cradle 12a and the carriage 13 is omitted, to make clear the positions of the segments 20a to 20c and 30a to 30c fastened on the support rings 40a. Although the segments 20a to 20c and 30a to 30c are each supported at both ends on the support rings 40a, 40b, only the support ring 40a (and cradle 12a supporting the support ring 40a) are illustrated in the schematic views for easier explanation. Therefore, of course, the segments 20a to 20c and 30a to 30c are each supported on the cradle 12b and fastened to the support ring 40b, like the support ring 40a.

As shown in FIG. 6, the cradle 12a mounted to the carriage 13 supports the support ring 40a (and support ring 40b which is not shown). Between the support rings 40a, 40b, a precision rail 17 is disposed in a hollow space of the annular support rings 40a, 40b, when viewed from the outer surface 44 of the support ring 40a (40b).

The precision rail 17 is an assembling apparatus for assembling the segments 20a to 20c and 30a to 30c by fastening them to the annular support rings 40a, 40b. As shown in FIG. 6, the precision rail 17 includes a jack section 171, a work table 172, and a rail body 173. The precision rail 17 is placed between the pair of the support rings 40a, 40b, although not clearly shown in FIG. 6.

As shown in FIG. 6, the jack section 171 places thereon the segments 20a to 20c and 30a to 30c one by one, such as the second segment 30b, and lifts it in the 12 o'clock direction (arrow Lf in FIG. 6). The work table 172 is, as described later, installed to allow the operators to work for joining the first segments 20a to 20c to the second segments 30a to 30c. The rail body 173 supports the jack section 171 and the work table 172 and includes a drive mechanism for driving the jack section 171, etc.

The second segment 30b of a first order is placed on the jack section 171 of the precision rail 17. The jack section 171 is actuated to lift the second segment 30b in the 12 o'clock direction (vertically upward direction, arrow Lf in FIG. 6) up to a location above the support ring 40a. On the end surface 33 (see FIGS. 3A and 3B) of the second segment 30b, the male fastener members 351 and the male guide member 352 are provided, while on the fastening surface 43 (reverse side of the sheet of FIG. 6, see FIG. 5) of the support ring 40a, the female fastener members 41, the female guide members 42, and the fastening wedge members which are not shown in FIGS. 5 and 6 are provided.

As shown in FIGS. 7A and 7B, the male guide member 352 constituting the annular fastening/guide mechanism is a columnar member protruding from each of the end surfaces 33 of the second segments 30a to 30c. In the present embodiment, the male guide member 352 has a shape in which its tip end portion has a cylindrical shape having a diameter corresponding to a recess of the female guide member 42, and its rear end portion which is fastened to the end surface 33 is a circular base having a greater area than its tip end portion (see FIGS. 3A and 3B).

As shown in FIGS. 7A and 7B, the female guide member 42 constituting the annular fastening/guide mechanism is a member provided with a cutout or a recess into which the male guide member 352 is inserted. In the present embodiment, as described above, the female guide member 42 is a pair of rail members as described above, and the above stated recess is formed between the rails. The upper end portion of the female guide member 42 is closed by connecting the rails together, while the lower end portion thereof is open between the rails to allow the male guide member 352 to be introduced thereinto.

The specific configuration of the annular fastening/guide mechanism is not limited to that disclosed in the present embodiment, but other various configurations may be used. For example, the male guide member and the female guide member may be placed in a reversed manner, members other than the male guide member and the female guide member, may be used, a non-contact optical configuration utilizing a laser beam, rather than a configuration in which the guide members perform the guide operation in a contact state, etc., may be used.

As shown in FIGS. 8A and 8B, the male fastener members 351 constituting the annular fastening/retaining mechanism are provided on the both end surfaces 33 of the second segments 30a to 30c. The male fastener member 351 has a protruding portion 351a protruding from the reverse surface of each of the second segments 30a to 30c toward the obverse surface 31 (not shown in FIGS. 8A and 8B), and a support portion 351b protruding in the normal-line direction of the end surface 33 and supporting the protruding portion 351a. The protruding portion 351a has a through-hole 351c into which the fastening wedge member as described later is to be inserted.

In the present embodiment, the protruding portion 351 a has a plate-shaped portion, because the protruding portion 351a is required to have a specified area to form and retain the through-hole 351e penetrating the protruding portion 351a. The protruding portion 351a extends in the same direction as the direction in which the end surface 33 extends. The protruding portion 351a is supported by the support portion 351b extending vertically on the end surface 33 such that the protruding portion 351a is spaced apart from the end surface 33. Therefore, as shown in FIG. 8A, the end surface 33 and the plate-shaped protruding portion 351a are parallel to each other. Since the through-hole 351c is formed along the normal-line direction of the protruding portion 351a, the through-hole 351c extends in the same direction as the direction in which the end surface 33 extends.

As shown in FIG. 8A, the female fastener member 41 constituting the annular fastening/retaining mechanism includes a plate-shaped inserted portion 41a provided on the fastening surface 43 of the support ring 40a (40b). The inserted portion 41a has an opening 41b formed in a direction from the reverse surface of each of the second segments 30a to 30c toward the obverse surface 31 (not shown in FIG. 8A). When each of the second segments 30a to 30c (or first segments 20a to 20c) is lifted in the 12 o'clock direction from below, the protruding portion 351a of the male fastener member 351 is inserted into the opening 41b, so that each of the second segments 30a to 30c (or first segments 20a to 20c) is fastened to the fastening surface 43 of the support ring 40a (40b).

In the present embodiment, the inserted portion 41a has a plate-shaped member, like the protruding portion 351a, because the inserted portion 41a is required to have a certain area to form and retain the opening 41b into which the protruding portion 351a is inserted. Although in the present embodiment, the opening 41b is formed as the through-hole into which the inserted portion 41a is inserted, it may be formed as a recess. That is, the opening 41b formed in the inserted portion 41a may be the through-hole or the recess so long as a state in which each of the second segments 30a to 30c (or first segments 20a to 20c) is fastened to the fastening surface 43 is maintained by inserting the protruding portion 351a into the inserted portion 41a.

As shown in FIGS. 8A to 8C, in the present embodiment, there is provided a fastening wedge member 46 as a fastened state retaining member for retaining a state in which the male fastener member 351 is inserted into the female fastener member 41, i.e., a state in which each of the second segments 30a to 30c (or first segments 20a to 20c) is fastened to the fastening surface 43.

In the present embodiment, the fastening wedge member 46 has a wedge-shaped tip end portion, and includes at least a shaft portion connected to the tip end portion and a moving mechanism provided at a rear end side of the shaft portion. The fastening wedge member 46 is positioned to correspond to the female fastener member 41. As shown in FIG. 8A, the tip end portion of the fastening wedge member 46 is provided on the support ring 40a (40b) in parallel with the inserted portion 41 a of the female fastener member 41 above the inserted portion 41a.

The shaft portion of the fastening wedge member 46 is provided to penetrate a body of the support ring 40a (40b) along the normal-line direction of the fastening surface 43, and is configured such that the tip end portion is extended from or retracted to the fastening surface 43 by the moving mechanism at the rear end side. As shown in FIG. 8A, before the protruding portion 351a is inserted into the inserted portion 41a, the tip end portion of the fastening wedge member 46 is retracted inward relative to the opening 41b formed in the inserted portion 41a, and closer to the fastening surface 43 than the opening 41b such that the tip end portion does not overlap with the opening 41b. As shown in FIG. 8C, after the protruding portion 351a is inserted into the inserted portion 41a, the tip end portion of the fastening wedge member 46 is extended outward relative to the opening 41b by the moving mechanism, and away from the fastening surface 43 such that the tip end portion is inserted into the through-hole 351c of the protruding portion 351a.

Although FIGS. 8A to 8C show the configuration (protruding portion 351a, support portion 351b and through-hole 351c) of the male fastener member 351 of each of the second segments 30a to 30c, the male fastener member 251 of each of the first segments 20a to 20c includes a protruding portion 251a and a support portion 251b and is configured such that the protruding portion 251a has a through-hole 251c, as shown by brackets in FIGS. 8A to 8C. Therefore, detailed description of the male fastener member 251 will not be given.

Although in the present embodiment, the fastening wedge member 46 is provided on the support ring 40a (40b), it may be provided on the end surface 33 of each of the second segments 30a to 30c or the end surface 23 of each of the first segments 20a to 20c. Although the fastening wedge member 46 is positioned to overlap with the female fastener member 41 when viewed from the fastening surface 43, the position of the fastening wedge member 46 is not limited to this. The position of the fastening wedge member 46 may be anywhere else so long as the fastening wedge member 46 is extendable to and retracted from the protruding portion 351a in a state in which the protruding portion 351a is inserted into the inserted portion 41a and is insertable into the through-hole 351c in a state in which the fastening wedge member 46 is moved to an advanced position to the protruding portion 351a.

The fastened state retaining member is not limited to the fastening wedge member 46, but may have various configurations so long as the fastened state between the second segments 30a to 30c or the first segments 20a to 20c and the support rings 40a, 40b can be maintained by the male or female fastener members configured in any way.

The specific configuration of the annular fastening/retaining mechanism is not limited to the configuration disclosed in the present embodiment. The annular fastening/retaining mechanism may have any other configurations so long as each of the second segments 30a to 30e (or the first segments 20a to 20c) is lifted up from below, the end surface 33 is fastened to the fastening surface 43 of the support ring 40a (40b), and the fastened state is maintained. For example, the male fastener members and the female fastener members may be placed in a reversed manner, a configuration which does not include the fastened state retaining member may be used, a configuration including members other than the fastener member and the fastened state retaining member, etc., may be used.

Next, a description will be given of a procedure for fastening the second segments 30a to 30c to the support rings 40a, 40b, including the operation of the above stated annular fastening/guide mechanism and annular fastening/retaining mechanism.

As described above, the second segment 30b is placed on the jack section 171 of the precision rail 17, and the jack section 171 is actuated to lift the second segment 30b in the 12 o'clock direction, in the direction of the arrow Lf in FIGS. 8A to 8C. At this time, the male guide member 352 provided on the upper side of the end surface 33 of the second segment 30b is inserted into the recess between the rails of the female guide member 42 before the two male fastener members 351 provided on the lower side of the end surface 33 are inserted into the female fastener members 41, respectively. Thereafter, as shown in FIG. 7A, according to the up-movement of the second segment 30b, the male guide member 352 moves up within the recess between the rails of the female guide member 42, and the male fastener member 351 moves up as shown in FIG. 8A. In FIGS. 8A to 8C, the moving direction is indicated by an arrow Lf.

The male fastener members 351 are positioned at an equal distance from the male guide member 352. On both end surfaces 33, four male fastener members 351 are provided such that two male fastener members 351 are provided on each of the end surfaces 33. If the male guide member 352 is not provided, it becomes necessary to position each of the four male fastener members 351 such that it is inserted into the corresponding female fastener member 41 provided on the support ring 40a (40b). Since the second segment 30b is moved up in the state in which the male guide member 352 is inserted into the female guide member 42 and moved, it is lifted in the 12 o'clock direction, accurately. The allows the two male fastener members 351 provided on the same end surface 33 to be positioned properly to be inserted into the female fastener members 41, respectively.

Then, as shown in FIG. 9, the second segment 30b is lifted up to a location above the support ring 40a, the male guide member 352 reaches the closed portion of the upper end portion of the rails of the female guide member 42 as shown in FIG. 7B, while the protruding portion 351a of the male fastener member 351 is inserted into the opening 41b formed in the inserted portion 41a of the female fastener member 41 as shown in FIG. 8B. In this state, the second segment 30b is fastened to the fastening surface 43 of the support ring 40a.

Then, as indicated by an arrow Fr of FIG. 8B, the fastening wedge member 46 is extended outward relative to the fastening surface 43. As shown in FIG. 8C, the tip end portion of the fastening wedge member 46 is inserted into the through-hole 351c of the protruding portion 351a inserted into the inserted portion 41a. This can prevent the protruding portion 351a from disengaging from the opening 41b of the inserted portion 41a. Therefore, the state in which the second segment 30b is fastened to the fastening surface 43 is maintained stably.

The operation of the annular fastening/guide mechanism shown in FIGS. 7A and 7B, i.e., the operation in which the male guide member 352 is inserted into the female guide member 42 and moving within the recess of the female guide member 42 is referred to as "fastening/guide operation" of the annular fastening/guide mechanism. The operation of the annular fastening/retaining mechanism of FIGS. 8A to 8C, i.e., the operation in which the male fastener member 351 is inserted into the female fastener member 41 and the fastening wedge member 46 is inserted into the through-hole 351c of the male fastener member 351 is referred to as "fastening/retaining operation" of the annular fastening/retaining mechanism. The position of the fastening/guide operation of FIG. 7A and the position of the fastening/retaining operation of FIG. 8A have the same positional relationship. The position of the fastening/guide operation of FIG. 78 and the position of the fastening/retaining operation of FIG. 8B (and FIG. 8) have the same positional relationship.

The fastening/guide operation of FIGS. 7A and 7B and the fastening/retaining operation of FIGS. 8A to 8C are performed between the second segment 30b and the support ring 40b as well as between the second segment 30b and the support ring 40a. This allows the second segment 30b to be fastened between the pair of support rings 40a, 40b.

Figure 10:
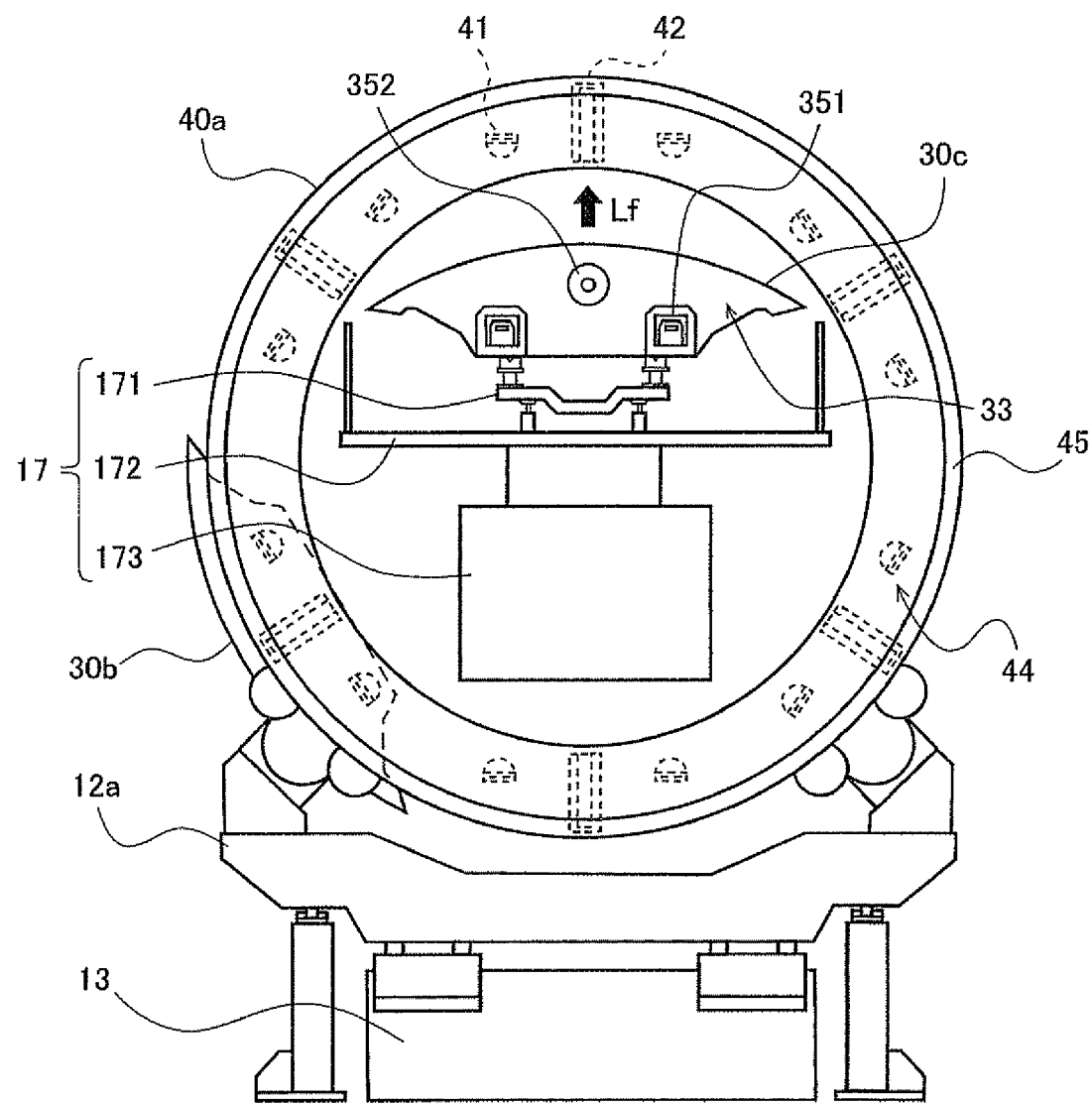
FIG. 10 is a schematic view showing a state in which the second segment of a second order is placed on the jack section to lift up the second segment in the 12 o'clock direction and to fasten it to the support rings, among the steps for assembling the mold used for manufacturing the composite material structure of FIG. 1.

Then, as indicated by an arrow Rt1 of FIG. 9, when the support ring 40a (and support ring 40b which is not shown in FIG. 9) is rotated about 120 degrees, the second segment 30b fastened to the upper side in FIG. 9 is moved to a location which is at left and lower side, as shown in FIG. 10. In this state, as shown in FIG. 10, the second segment 30c of a second order is placed on the jack section 171 of the precision rail 17, and the jack section 171 is actuated to lift the second segment 30c in the 12 o'clock direction, in the direction of the arrow Lf.

Figure 11:
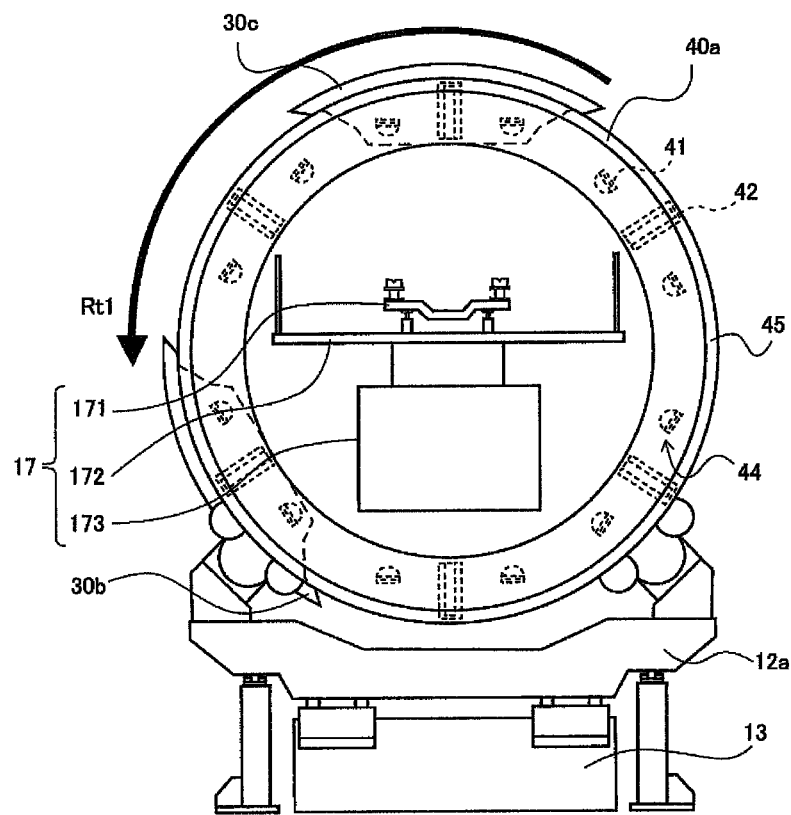
FIG. 11 is a schematic view showing a state in which the second segment of a second order is fastened to the support rings, among the steps for assembling the mold used for manufacturing the composite material structure of FIG. 1.

According to this lift-up movement, the fastening/guide operation and the fastening/retaining operation are performed as shown in FIGS. 7A and 7B, and as shown in FIGS. 8A and 8B. As shown in FIG. 11, the second segment 30c is fastened to the support rings 40a, 40b, and the support rings 40a, 40b are rotated about 120 degrees as indicated by the arrow Rt1. Thereby, as shown in FIG. 12, the second segment 30c of a second order fastened to the upper side is moved to a location which is at left and lower side, and the second segment 30b of a first order positioned at left and lower side is moved to a location at right and lower side.

Figure 12:
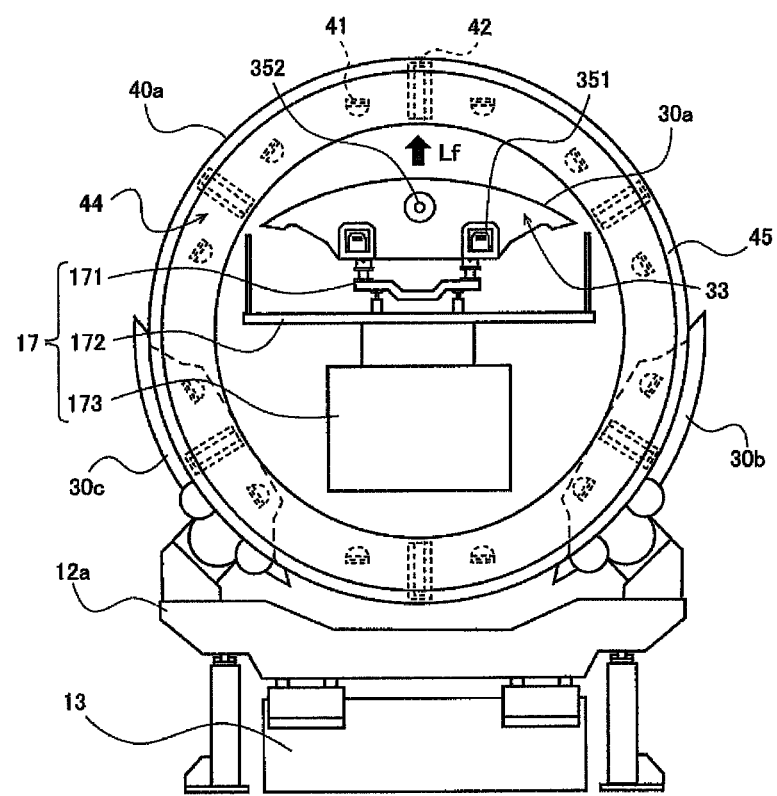
FIG. 12 is a schematic view showing a state in which the second segment of a third order is placed on the jack section to lift up the second segment in the 12 o'clock direction and to fasten it to the support rings, among the steps for assembling the mold used for manufacturing the composite material structure of FIG. 1.
Figure 13:
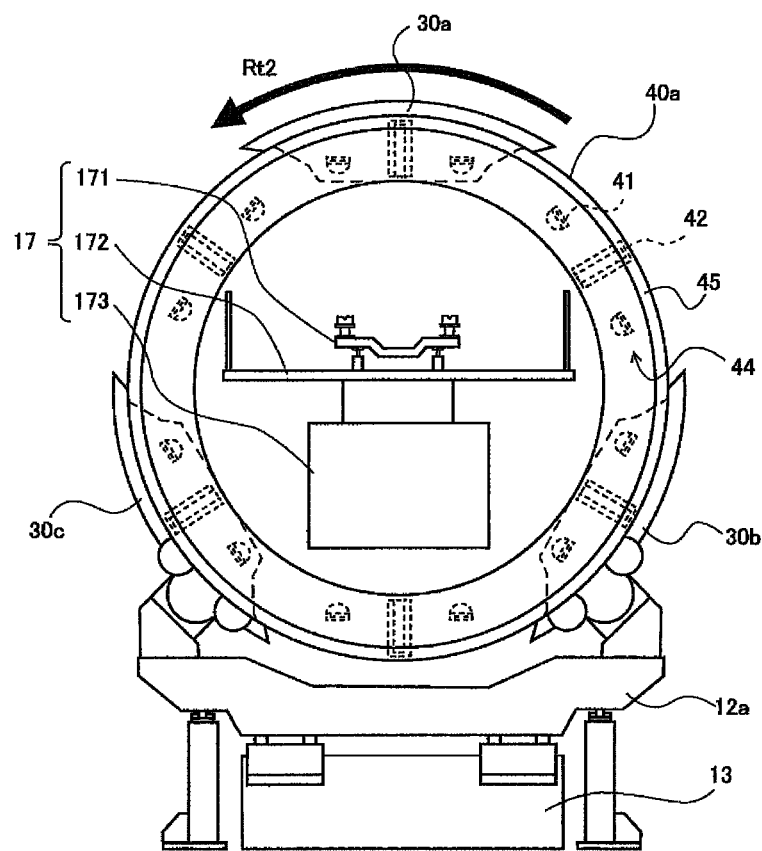
FIG. 13 is a schematic view showing a state in which the second segment of a third order is fastened to the support rings, among the steps for assembling the mold used for manufacturing the composite material structure of FIG. 1.

Then, as shown in FIG. 12, the second segment 30a of a third order is lifted in the 12 o'clock direction as indicated by the arrow Lf. According to this lift-up movement, the fastening/guide operation and the fastening/retaining operation are performed. As shown in FIG. 13, the second segment 30a of a third order is fastened to the support rings 40a, 40b. As a result, all of the second segments 30a to 30c are fastened to the support rings 40a, 40b.

[Assembling Method of Mandrel, Fastening and Joining of First Segment]

Next, the operation of fastening each of the first segments 20a to 20c between corresponding ones of the second segments 30a to 30c occurs. A description will be given of the fastening method and fastening work of the first segments 20a to 20c, with reference to FIGS. 14 to 21, along with the specific configuration of the segment joining/retaining mechanism and the segment joining/guide mechanism.

Figure 14:
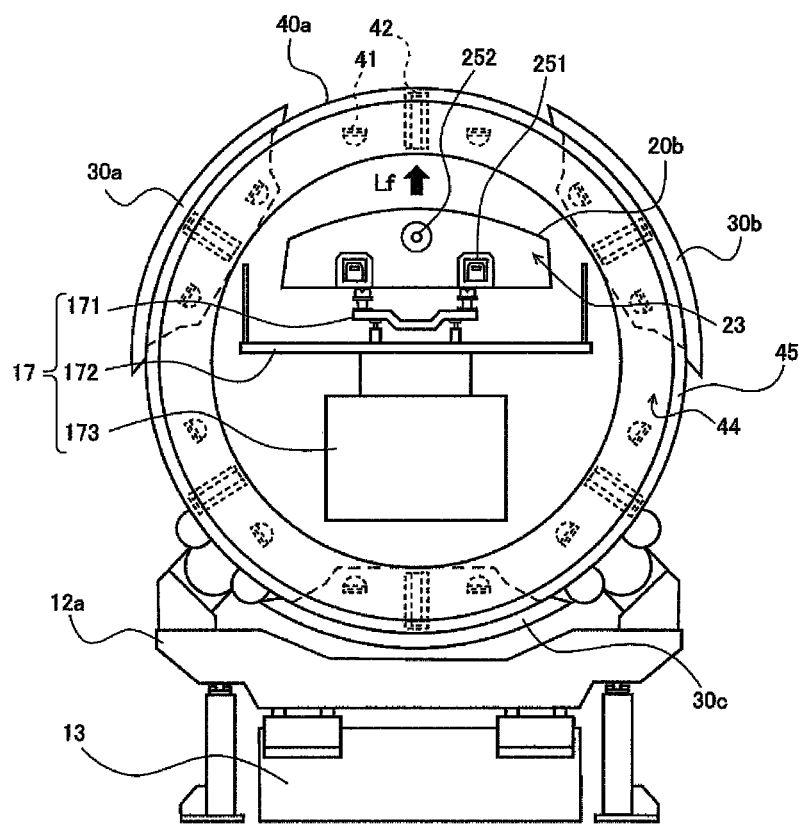
FIG. 14 is a schematic view showing a state in which the second segment is placed on the jack section to lift a first segment of a first order in the 12 o'clock direction and to fasten it to the support rings, among the steps for assembling the mold used for manufacturing the composite material structure of FIG. 1.
Figure 15:
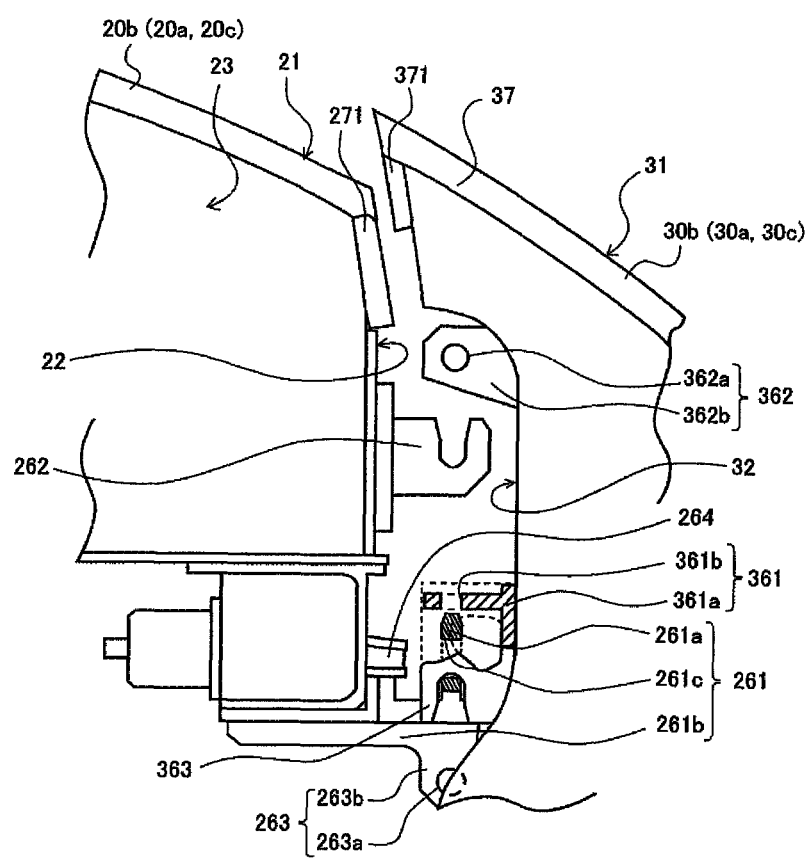
FIG. 15 is a schematic view showing an example of the configuration of a segment joining/retaining mechanism and a segment joining/guide mechanism provided on the side surface of the first segment and the side surface of the second segment.
Figure 16A:
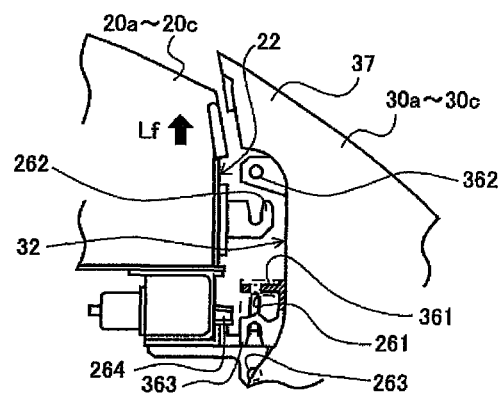
FIGS. 16A to 16C are schematic views showing the operation of the segment joining/retaining mechanism and the segment joining/guide mechanism of FIG. 15, when the first segment is lifted up and joined to the second segment.
Figure 16B:
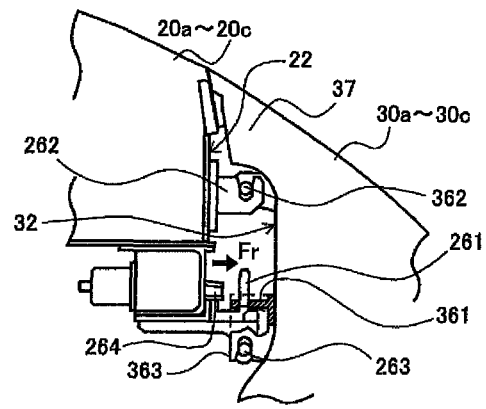
Figure 16C:
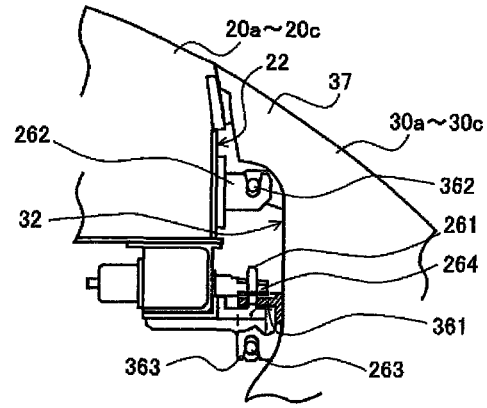
Figure 17A:
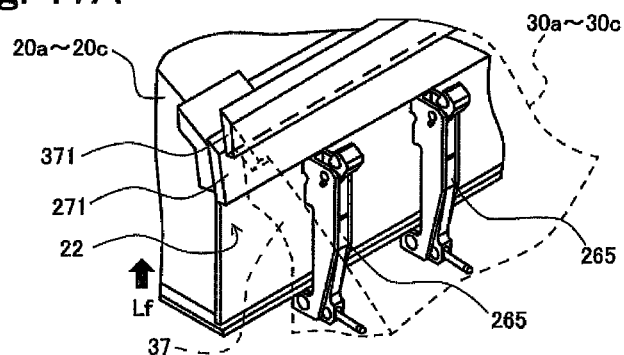
FIGS. 17A to 17C are schematic views showing an example of the configuration and operation of a clamp member which is one constituent of the segment joining/retaining mechanism when the first segment is joined to the second segment.
Figure 17B:
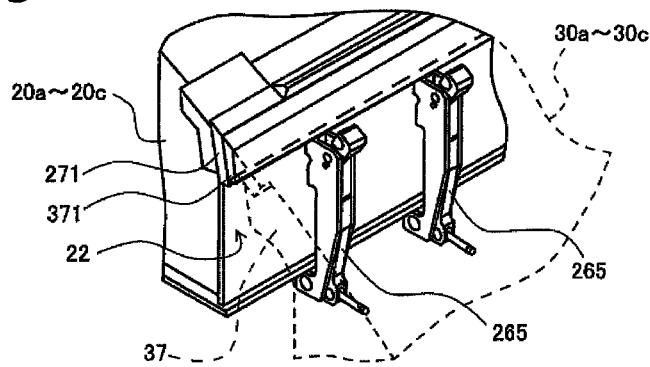
Figure 17C:
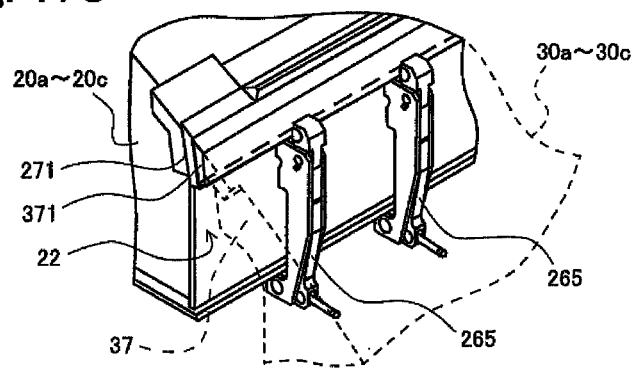
Figure 18:
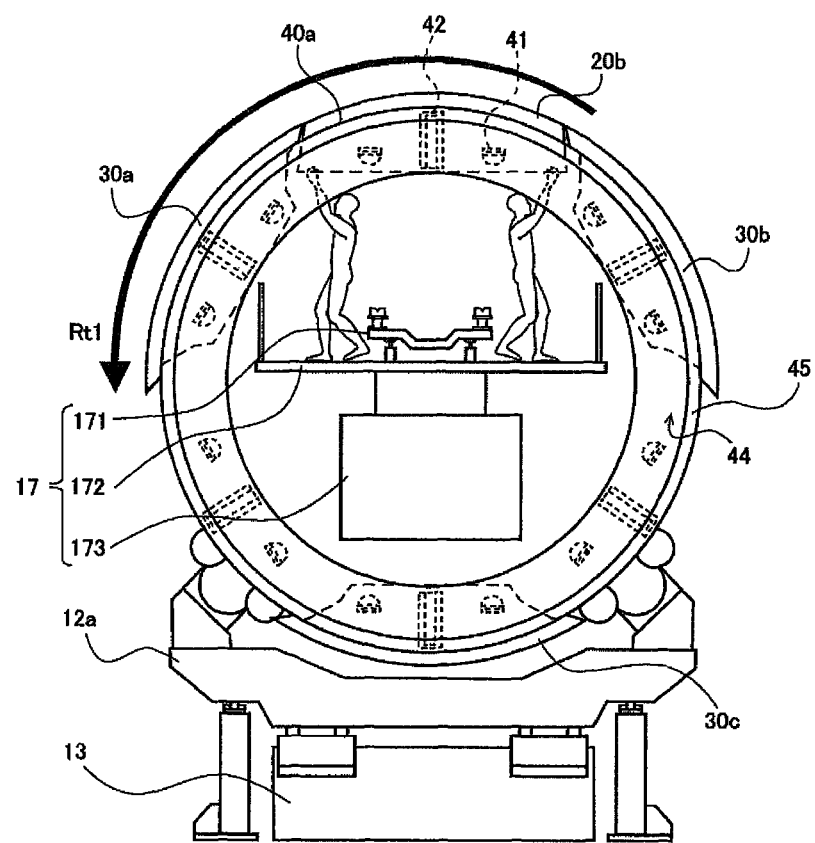
FIG. 18 is a schematic view showing a work state in which the first segment of a first order is fastened to the support rings and joined to second segments at both sides, among the steps for assembling the mold used for manufacturing the composite material structure of FIG. 1.

FIG. 14 is a schematic view showing a state in which the first segment 20b of a first order is placed on the jack section 171 to lift the first segment 20b in the 12 o'clock direction and to fasten it to the support ring 40a (and support ring 40b). FIG. 15 is a schematic view showing the configuration of the segment joining/retaining mechanism and the segment joining/guide mechanism provided on the side surface 22 of each of the first segments 20a to 20c and the side surface 32 of each of the second segments 30a to 30c. FIGS. 16A to 16C are schematic views showing the operation of the segment joining/retaining mechanism and the segment joining/guide mechanism of FIG. 15, when the first segment 20b is lifted up and joined to the second segment 30b. FIGS. 17A to 17C are schematic views showing the configuration and operation of a clamp member which is one constituent of the segment joining/retaining mechanism. FIG. 18 is a schematic view showing a work state where the first segment 20b of a first order is fastened to the support ring 40a and joined to the second segments 30a, 30b. FIGS. 19 to 22 are schematic views showing the placed state, and a work state of the operation of fastening and joining, when the first segment 20c of a second order or the first segment 20a of a third order is fastened sequentially to the support ring 40a and joined sequentially to the second segments 30a to 30c.

As shown in FIG. 14, the first segment 20b of a first order is placed on the jack section 171 of the precision rail 17 and is lifted in the 12 o'clock direction, to a location above the support ring 40a, as indicated by the arrow Lf. On the end surface 23 (see FIGS. 2A and 2B) of the first segment 20b, the male fastener members 251 and the male guide member 252 are provided. As in the case of the second segments 30a to 30c, the above stated fastening/guide operation and the above stated fastening/retaining operation are performed for the first segment 20b. Thereby, the first segment 20b is fastened to the support rings 40a, 40b.

Then, as shown in FIG. 15 and FIGS. 16A to 16C, on each of the side surfaces 22 of the first segment 20b (and first segment 20c, 20a), the male joining member 261 and the joining wedge member 264 constituting the segment joining/retaining mechanism, and the outer peripheral female guide member 262 and the inner peripheral male guide member 263 constituting the segment joining/guide mechanism are provided. As shown in FIG. 15, on each of the side surfaces 32 of the second segment 30b (and second segment 30c, 30a), the female joining member 361 constituting the segment joining/retaining mechanism, and the outer peripheral male guide member 362 and the inner peripheral female guide member 363 constituting the segment joining/guide mechanism are provided.

In FIG. 15 and FIGS. 16A to 16C, the male fastener member 251 on the end surface 23 of the first segment 20b is not illustrated to explicitly describe the configuration of the segment joining/retaining mechanism and the segment joining/guide mechanism. As shown in FIGS. 16A to 16C, a part of the configuration of FIG. 15 is omitted or shown in a simple manner, to explicitly describe the operation of the segment joining/guide mechanism and the segment joining/retaining mechanism as described later.

The male joining member 261 is disposed below the outer peripheral female guide member 262 in FIGS. 16A to 16C (vertically below when the first segments 20a to 20c are placed horizontally). The specific configuration of the male joining member 261 is similar to that of the male fastener member 251 or 351 constituting the annular fastening/retaining mechanism. Specifically, the male joining member 261 includes a protruding portion 261a protruding in the direction from the reverse surface of each of the first segments 20a to 20c toward the obverse surface 21, and a support portion 261b supporting the protruding portion 261a. The protruding portion 261a has a through-hole 261c. In FIG. 15, to easily describe the through-hole 261c, the protruding portion 261a is illustrated as a particle cross-sectional view.

Like the fastening wedge member 46 as the fastened state retaining member, the joining wedge member 264 is provided on the inner side of the side surface 22 of each of the first segments 20a to 20c and is extendable to and retractable from a protruding portion 261a of the male fastener member 251 located on the outer side of the side surface 22. That is, the fastening wedge member 46 as the fastened state retaining member is provided on the surface (fastening surface 43 of the support ring 40a (40b)) on which the female fastener member 41 is fastened, while the joining wedge member 264 constituting the segment joining/retaining mechanism is provided on the surface (side surface 22 of each of the first segments 20a to 20c) on which the male joining member 261 is fastened.

The joining wedge member 264 is a member for retaining the joined state of each of the first segments 20a to 20c and each of the second segments 30a to 30c by the male joining member 261 and the female joining member 361, i.e., the joined state retaining member. The joining wedge member 264 may be provided on the side surface 32 of each of the second segments 30a to 30c, instead of the side surface 22 of each of the first segments 20a to 20c.

On underside of the protruding portion 261a of the male joining member 261, the inner peripheral male guide member 263 is provided. In the configuration of FIG. 15, the lower portion of the support portion 261b protrudes to form a guide support portion 263b, and a cylindrical male guide body 263a is provided on the guide support portion 263b. When the protruding portion 261a protrudes in an upward direction in FIG. 15 (direction from the reverse side of each of the first segments 20a to 20e toward the obverse surface 21), the male guide body 263a protrudes in the normal-line direction (normal-line direction of the end surface 23 of each of the first segments 20a to 20c) in FIG. 15. Therefore, the male joining member 261 and the inner peripheral male guide member 263 protrude to form a right angle.

The outer peripheral female guide member 262 is located above the male joining member 261 and the inner peripheral male guide member 263 in FIG. 15, i.e., on the obverse surface 21 side of each of the first segments 20a to 20c. The outer peripheral female guide member 262 has a plate shape extending vertically from the side surface 22 in parallel with the end surface 23. The outer peripheral female guide member 262 is provided with a cutout formed in a direction from the obverse surface 21 side toward the reverse side. The cutout has a shape in which its dimension is greater in an opening and smaller in an inner portion. The dimension of the cutout is constant from an intermediate position in a lengthwise direction and its innermost portion has a circular-arc shape.

As shown in FIG. 15, the female joining member 361, the outer peripheral male guide member 362 and the inner peripheral female guide member 363 are provided on the side surface 32 of each of the second segments 30a to 30c such that they are hidden by the cave portion 37, when viewed from the obverse surface 31 of each of the second segments 30a to 30c.

Like the female fastener member 41 constituting the annular fastening/retaining mechanism, the female joining member 361 includes a plate-shaped inserted portion 361a positioned to correspond to the male joining member 261 on the side surface 32 of each of the second segments 30a to 30c. The inserted portion 361a has an opening 361b formed in a direction from the reverse surface of each of the second segments 30a to 30c toward the obverse surface 31. The opening 361b may be a recess instead of a through-hole. In FIG. 15 (and FIGS. 16A to 16C), the female joining member 361 is shown as a cross-sectional view to describe the opening 361b easily.

The outer peripheral male guide member 362 is positioned closer to the obverse surface 31 of each of the second segments 30a to 30c than the female joining member 361. Like the inner peripheral male guide member 263, the outer peripheral male guide member 362 is configured such that a cylindrical male guide body 362a protrudes in the normal-line direction in FIG. 15 from a plate-shaped guide support portion 362b provided on the side surface 32 in parallel with the direction in which the end surface 23 extends. The male guide body 362a is inserted into the cutout of the outer peripheral female guide member 262 provided on each of the first segments 20a to 20c.

The inner peripheral female guide member 363 is integral with an outer member covering the female joining member 361 and includes a cutout formed on the lower side of the outer member. In FIG. 15 (and FIGS. 16A to 16C), an upper portion covering the female joining member 361 is indicated by a dotted line and only a portion in the vicinity of the cutout at the lower side as indicated by a solid line, to easily describe them. The inner peripheral male guide member 263 provided on each of the first segments 20a to 20c is inserted into the cutout.

Therefore, the female joining member 361, the outer peripheral male guide member 362, and the inner peripheral female guide member 363, which are provided on the side surface 32 of each of the second segments 30a to 30c face the male joining member 261, the outer peripheral female guide member 262, and the inner peripheral male guide member 263, which are provided on the side surface 22 of each of the first segments 20a to 20e, when the side surface 22 of each of the first segments 20a to 20c faces the side surface 32 of the corresponding one of the second segments 30a to 30c, respectively.

The male joining member 261 and the female joining member 361 may have various configurations like the male fastener members 251, 351, and the female fastener member 41, and their configurations are not limited to the configurations disclosed in the present embodiment. In addition, the configurations of the outer peripheral female guide member 262 having the cutout and the inner peripheral female guide member 363 having the cutout are not particularly limited, but they may have any configuration so long as they have a cutout portion or a recess portion whose dimension decreases gradually from the obverse surface 21 or the obverse surface 31 toward the reverse surface. Furthermore, the specific configurations of the outer peripheral male guide member 362 inserted into the outer peripheral female guide member 262 and the inner peripheral male guide member 263 inserted into the inner peripheral female guide member 363 are not particularly limited to those disclosed in the present embodiment, so long as they have an insertion portion inserted into the cutout portion or the recess portion.

Moreover, in the present embodiment, as the segment joining/retaining mechanism, clamp members 265 shown in FIGS. 17A to 17C are provided. The clamp members 265 join the segments 20, 30 together in such a manner that the clamp members 265 press the reverse surface of a folded edge portion 371 provided at the cave portion 37 of each of the second segments 30a to 30c, in a state where the support edge portion 271 provided on the side surface 22 of each of the first segments 20a to 20c, and the folded edge portion 371 face each other.

In the present embodiment, as shown in FIGS. 17A to 17C, the clamp member 265 has a length substantially across the side surface 22 of each of the first segments 20a to 20c. One end portion of the clamp member 265 is a portion for pressing the reverse surface of each of the first segments 20a to 20c, and the other end portion is a portion for pressing the edge of the side surface 22 on the obverse surface 21 side.

To easily describe the configuration of the clamp member 265, the male joining member 261, the outer peripheral female guide member 262, the inner peripheral male guide member 263, and the joining wedge member 264 on the side surface 22 of each of the first segments 20a to 20c, are not shown in FIGS. 17A to 17C, and each of the second segments 30a to 30c is indicated by dotted line except for the folded edge portion 371 associated with joining and retaining by the clamp member 265.

As shown in FIG. 15 and FIG. 17A, the support edge portion 271 is a plate-shaped member provided at the edge of each of the first segments 20a to 20c on the obverse surface 21 side. As shown in FIG. 17C, the support edge portion 271 is clamped by the other end portion of the clamp member 265 via the folded edge portion 371. As shown in FIG. 15 and FIGS. 17A and 17B, the folded edge portion 371 is a plate-shaped portion folded back from the obverse surface 31 toward the reverse surface at the tip end of the eave portion 37 of each of the second segments 30a to 30c. As shown in FIG. 17B, in a state where the obverse surface 21 of each of the first segments 20a to 20c and the obverse surface 31 of each of the second segments 30a to 30c are aligned such that they form a continuous surface, the clamp member 265 clamps the reverse surface of the folded edge portion 371, thereby allowing the folded edge portion 371 to be seized between the clamp member 265 and the support edge portion 271 of each of the first segments 20a to 20c.

In the present embodiment, to allow the clamp member 265 to clamp the folded edge portion 371 more properly, the support edge portion 271 is provided on the side surface 22 of each of the first segments 20a to 20c to contact the folded edge portion 371. Alternatively, the support edge portion 271 may be omitted, and the surface of the folded edge portion 371 may directly contact the side surface, or the side surface 22 of each of the first segments 20a to 20c and the portion of each of the second segments 30a to 30c in the vicinity of the eave portion 37 may be clamped by the clamp member 265 using a configuration other than the folded edge portion 371.

Next, a description will be given of a procedure for fastening the first segment 20b to the support ring 40a (40b), including the operation of the above stated segment joining/guide mechanism and segment joining/retaining mechanism.

As shown in FIG. 13, after the second segment 30a of a third order is fastened to the support ring 40a (40b), the support ring 40a (40b) is rotated about 60 degrees as indicated by the arrow Rt2. When the second segments 30a to 30c are fastened to the support ring 40a (40b) firstly, the second segments 30a to 30c are fastened to every two fastening locations of the support ring 40a (40b). Therefore, the support ring 40a (40b) is required to be rotated with a rotational angle of 120 degrees corresponding to the fastening locations of two segments. However, in this step, since the first segment 20b is fastened to the support ring 40a (40b), the rotational angle is 60 degrees corresponding to one segment.

Then, as shown in FIG. 14, the first segment 20b of a first order is placed on the jack section 171 of the precision rail 17 and is lifted in the 12 o'clock direction as indicated by the arrow Lf. At this time, the male guide member 252 and the male fastener member 251 provided on the end surface 23 of the first segment 20b, and the female guide member 42, the female fastener member 41 and the fastening wedge member 46 which are provided on the fastening surface 43 of the support ring 40a (40b) perform the above stated fastening/guide operation and fastening/retaining operation.

As shown in FIG. 16A, when the first segment 20b is lifted up, the cutout of the outer peripheral female guide member 262 provided on the upper side is fitted into the outer peripheral male guide member 362 provided on the upper side of the side surface 32 of the second segment 30b before the male joining member 261 provided on the lower side of the side surface 22, and the outer peripheral female guide member 262 moves up such that the male guide body 362a moves within the cutout. According to this, the male joining member 261 moves up. In FIG. 16A, the moving direction is indicated by the arrow Lf.

A plurality of (five in the configuration of FIG. 2A) male joining members 261 are provided on the side surface 22 of the first segment 20b, and the male joining member 261 is below the outer peripheral female guide member 262 (on the opposite side to the upward direction). By fitting between the outer peripheral female guide member 262 and the outer peripheral male guide member 362 and movement of them, the first segment 30b is guided in the 12 o'clock direction accurately. This allows the plurality of male joining members 261 to be positioned properly to be inserted into the corresponding female joining members 361, respectively.

Then, as shown in FIG. 18, when the first segment 20b reaches a location above the support ring 40a, as shown in FIG. 15B, the outer peripheral male guide member 362 reaches the intermediate position of the cutout of the outer peripheral female guide member 262, and the protruding portion 261a (no reference symbol is assigned to the protruding portion 261a in FIGS. 16A to 16C) of the male joining member 261 is inserted into the opening 361b formed in the inserted portion 361a of the female joining member 361 (no reference symbol is assigned to the inserted portion 361a and the opening 361b in FIGS. 16A to 16C). In this state, the side surface 22 of the first segment 20b is joined to the side surface 32 of the second segment 30b.

As shown in FIG. 15B, the inner peripheral male guide member 263 is positioned below the male joining member 261. The inner peripheral male guide member 263 and the male joining member 261 move up and are inserted into the cutout of the inner peripheral female guide member 363 and reach the intermediate position of the cutout. In this state, the obverse surface 21 of each of the first segments 20a to 20c and the obverse surface 31 of each of the second segments 30a to 30c are aligned such that they form a continuous surface, the side surface 22 and the side surface 32 face each other in the state where they are positioned accurately on the outer peripheral side and on the inner peripheral side.

In addition, in a state in which the first segment 20b is lifted up as shown in FIG. 17A, the obverse surface 21 and the obverse surface 31 form a continuous surface, and the side surface 22 and the side surface 32 face each other, as shown in FIG. 17B the support edge portion 271 provided on the side surface 22 of the first segment 20b and the folded edge portion 371 provided at the tip end of the eave portion 37 of the second segment 30b are in contact such that they face each other.

Then, as indicated by the arrow Fr of FIG. 16B, the joining wedge member 264 moves to an advanced position outward relative to the side surface 22, and as shown in FIG. 16C, the tip end portion of the joining wedge member 264 is inserted into the through-hole 261c of the protruding portion 261a inserted into the inserted portion 361a. This can prevent the protruding portion 261a from disengaging from the opening 361b of the inserted portion 361a. Therefore, the state in which the first segment 20b and second segment 30b are joined together is maintained stably.

As shown in FIG. 17C, in the support edge portion 271 and the folded edge portion 371 facing each other, the clamp member 265 clamps the reverse surface of the folded edge portion 371 (surface opposite to the surface facing the support edge portion 271). As shown in FIG. 18, the clamping by the clamp member 265 is performed by an operator's hand. In this state, one end portion of the clamp member 265 clamps the reverse surface of the first segment 20b, while the other end portion of the clamp member 265 clamps the upper edge (support edge portion 271) of the side surface 22 of the first segment 20b via the folded edge portion 371. This allows the second segment 30b to be fastened to the side surface 22 of the first segment 20b at the tip end of the eave portion 37. Therefore, the state in which the first segment 20b and second segment 30b are joined together is maintained more stably.

The operation of the segment joining/guide mechanism shown in FIGS. 16A to 16C, i.e., the operation in which the cutout of the outer peripheral female guide member 262 is fitted to the outer peripheral male guide member 362 and the male guide body 362a moves within the cutout, and the operation in which the inner peripheral male guide member 263 is inserted into the cutout of the inner peripheral female guide member 363, and the male guide body 263a moves within the cutout, are referred to as "joining/guide operation" of the segment joining/guide mechanism. The operation of the segment joining/retaining mechanism shown in FIGS. 16A to 16C and FIGS. 17A to 17C, i.e., the operation in which the male joining member 261 is inserted into the female joining member 361 and the joining wedge member 264 is inserted into through-hole 261c of the male joining member 261, and the operation in which the clamp member 265 clamps the support edge portion 271 via the folded edge portion 371 are referred to as "joining/retaining operation" of the segment joining/retaining mechanism.

The joining/guide operation and the joining/retaining operation shown in FIGS. 16A to 16C and FIGS. 17A to 17C are performed between the first segment 20 and the second segment 30a of a third order at the left side in FIG. 18 as well as the first segment 20 and the second segment 30b of a first order at the right side in FIG. 18. In this way, the adjacent segments 20 and 30 are joined together and retained.

Figure 19:
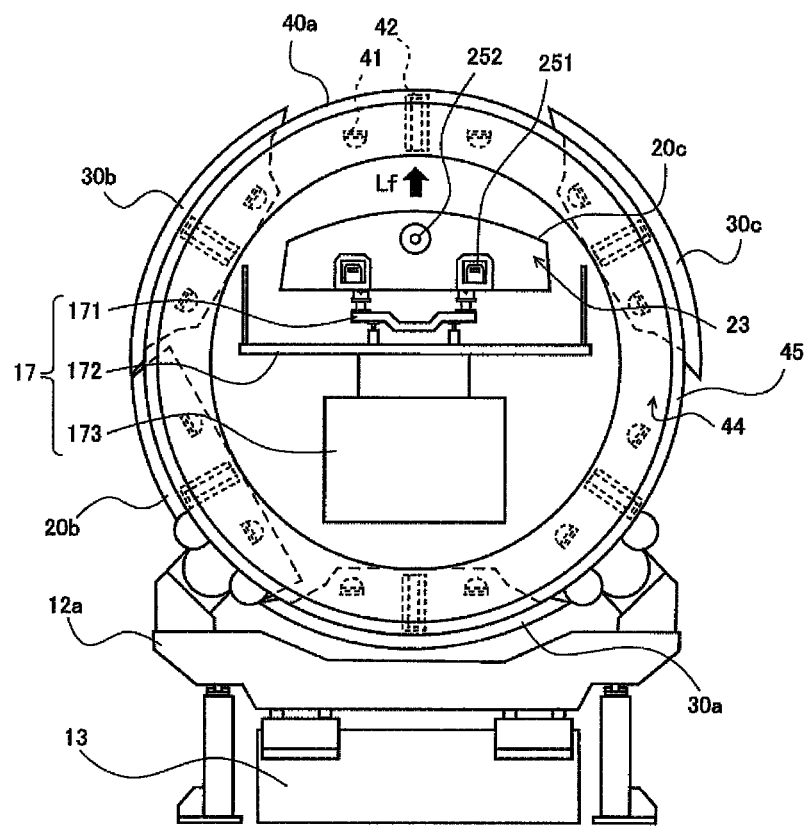
FIG. 19 is a schematic view showing a state in which the second segment is placed on the jack section to lift a first segment of a second order in the 12 o'clock direction and to fasten it to the support rings, among the steps for assembling the mold used for manufacturing the composite material structure of FIG. 1.

Then, as shown in the arrow Rt1 of FIG. 18, the support ring 40a (and the support ring 40b which is not shown) are rotated about 120 degrees, and thereby the first segment 20b fastened to the upper side in FIG. 18 is moved to a location which is at left and lower side in FIG. 19. In this state, as shown in FIG. 19, the first segment 20c of a second order is placed on the jack section 171 of the precision rail 17, and the jack section 171 is actuated to lift the first segment 20c in the 12 o'clock direction in the arrow Lf direction.

Figure 20:
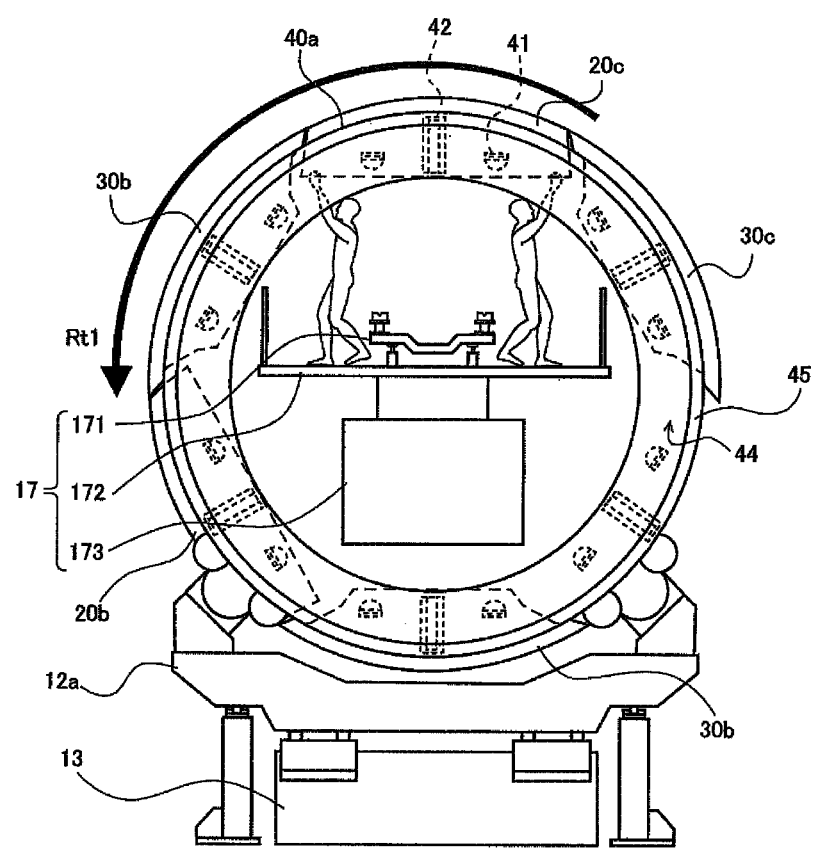
FIG. 20 is a schematic view showing a work state in which the first segment of a second order is fastened to the support rings and joined to second segments at both sides, among the steps for assembling the mold used for manufacturing the composite material structure of FIG. 1.

According to this lift-up movement, the fastening/guide operation and the fastening/retaining operation are performed between the end surface 23 of the first segment 20c and the support rings 40a, 40b. In addition, the joining/guide operation and the joining/retaining operation are performed between the side surface 22 of the first segment 20c and the second segments 30b and 30c adjacent to the first segment 20c. Thus, as shown in FIG. 20, the first segment 20c is fastened to the support rings 40a, 40b, and to the second segments 30b, 30b. Then, as indicated by the arrow Rt1, the support rings 40a, 40b are rotated about 120 degrees. Thus, as shown in FIG. 21, the first segment 20c of a second order which is fastened to the upper side is moved to a location at left and lower side, and the first segment 20b of a first order at this location is moved to a location at right and lower side.

Figure 21:
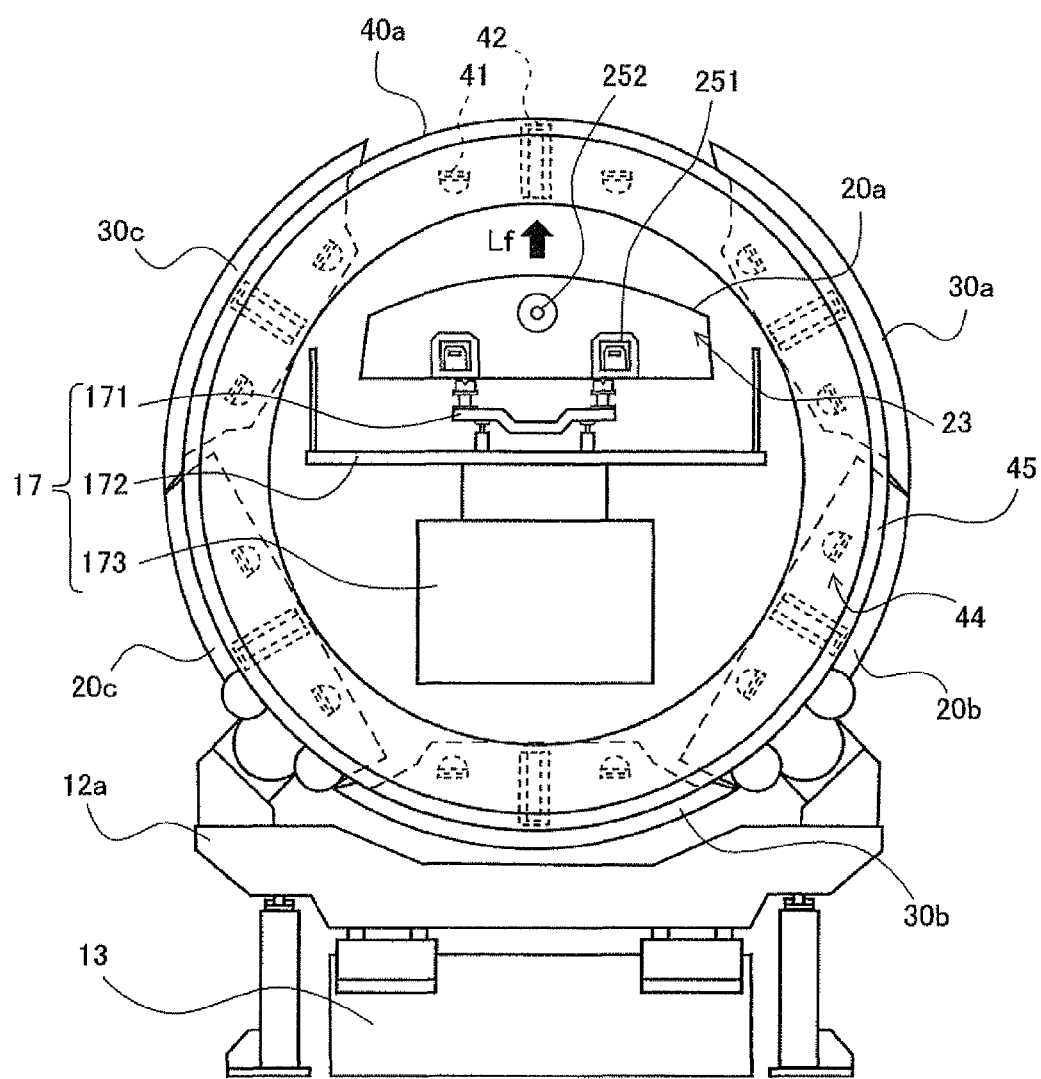
FIG. 21 is a schematic view showing a state in which the second segment is placed on the jack section to lift a first segment of a third order in the 12 o'clock direction and to fasten it to the support rings, among the steps for assembling the mold used for manufacturing the composite material structure of FIG. 1.
Figure 22:
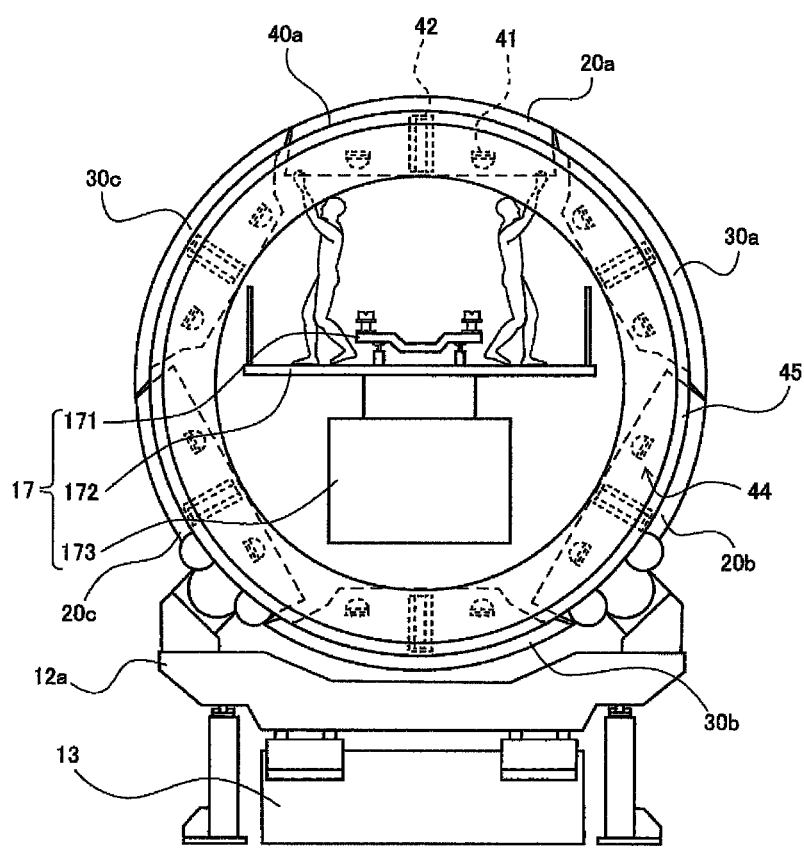
FIG. 22 is a schematic view showing a work state where the first segment of a third order is fastened to the support rings and joined to second segments at both sides, among the steps for assembling the mold used for manufacturing the composite material structure of FIG. 1.

Then, as shown in FIG. 21, the first segment 20a of a third order is lifted in the 12 o'clock direction as indicated by the arrow Lf. According to this lift-up movement, the fastening/guide operation and the fastening/retaining operation, the joining/guide operation and the joining/retaining operation are performed. As shown in FIG. 22, the first segment 20a of a third order is fastened to the support rings 40a, 40b and to the second segments 30c and 30a As a result, all of the first segments 20a to 20c are fastened to the support rings 40a, 40b, and all of the segments 20a to 20c and 30a to 30c are joined together and retained. As a result, as shown in FIG. 1, assembling of the mold 10 including the mandrel 11 retained on the support rings 40a, 40b is completed.

In accordance with this embodiment, there may be provided a second segment connecting step in which each of the second segments 30a to 30c is lifted vertically to a second connecting portion which is the uppermost side, among a plurality of first connecting portions and a plurality of second connecting portions set alternately along a circumferential direction on a pair of support rings 40a, 40b facing each other, and is connected to the second connecting portion, a rotation step of rotating the support rings 40a, 40b together with each of the second segments 30a to 30e which is connected to the second connecting portion, and is located at the first connecting portion up to the uppermost portion of the support rings 40a, 40b, and a first segment connecting step in which each of the first segments 20a to 20c is connected to the first connecting portion which is the uppermost side.

Figure 24:
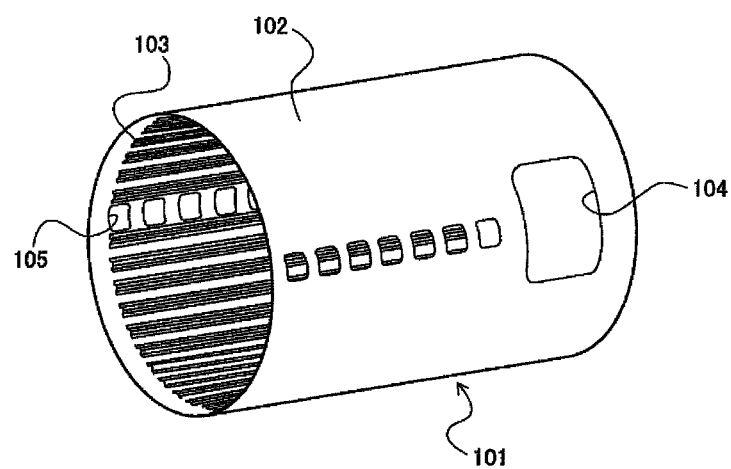
FIG. 24 is a perspective view showing an example of the configuration of a fuselage of an aircraft formed as a one piece barrel (OPB), which is an example of a composite material structure.

By using the mold 10 having the above configuration, the cylindrical composite material structure, for example, the OPB of FIG. 24 can be molded. After the molding, the mold 10 is removed by disassembling the mandrel 11. This disassembling method is performed in a reversed order of the above described assembling method. The first segments 20a to 20c are drawn out in a downward direction and removed one by one and then the second segments 30a to 30c are moved in a downward direction and removed one by one.

Modified Example

The specific configuration of the mold 10 used for manufacturing the composite material structure is not limited to the above stated configuration in which three first segments 20 and three second segments 30 are provided but may be another configuration.

Figure 23A:
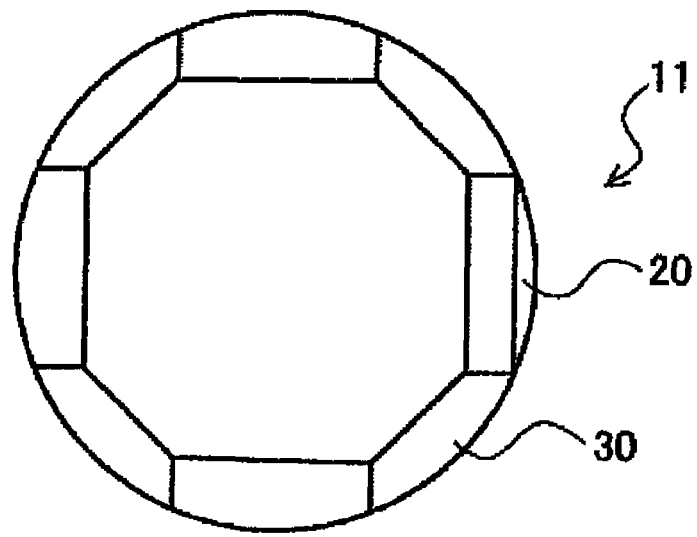
FIGS. 23A and 23B are schematic views showing another example of the configuration of the mandrel of FIG. 4.

For example, as shown in FIG. 23A, the mandrel 11 may be divided into eight parts including the first segments 20 whose side surfaces face horizontally or are inclined in an upward direction and the second segments 30 whose side surfaces face downward, which configuration is similar to the above stated configuration.

Figure 23B:
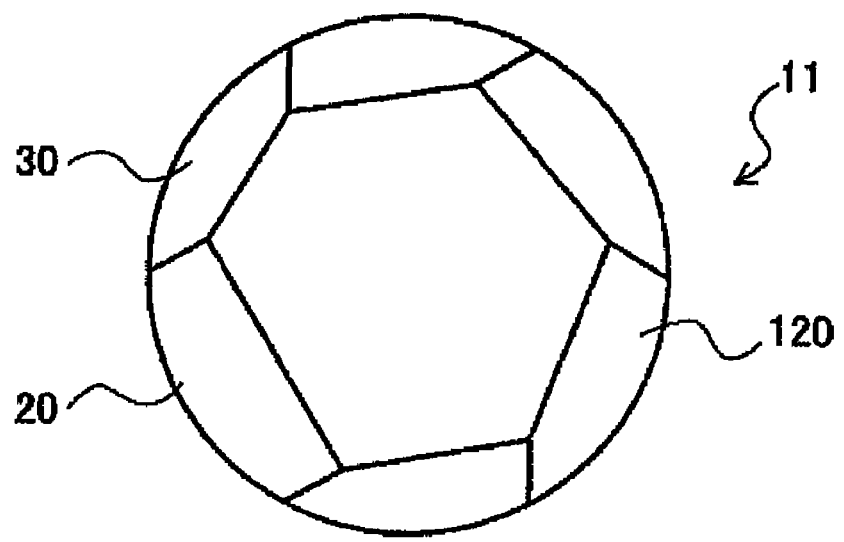

Or, as shown in FIG. 23B, the mandrel 11 may be divided into six parts as described above and include one first segment 20, one second segment 30, and four fourth segments 120 in which one of side surfaces thereof faces horizontally or is inclined in an upward direction and the other side surface faces downward.

Or, although not shown, the mandrel 11 may be divided into odd-numbered (seven or five) parts. In the present embodiment, the number of parts of the segment, or the shapes of the individual segments are not particularly limited so long as the mandrel composed of plural kinds of segments are fastened to the annular retaining members such as the support rings 40a, 40b.

In other words, in the present invention, the specific shapes, kinds, number, etc., of the segments are not particularly limited so long as the mandrel (cylindrical member) 11 is assembled by joining the plurality of segments of a substantially rectangular shape divided along its center axis line.

The annular retaining members for retaining the first segments 20 and the second segments 30 constituting the mandrel 11 are not limited to the above stated support rings 40a, 40b, but may be another members. For example, the annular retaining members may be end rings, etc., instead of the support rings 40a, 40b.

The present invention is not limited to the above described embodiments, but may be changed in various ways within a scope of the claims, and embodiments obtained by suitably combining technical means disclosed in different embodiments or plural modified examples may be included in the technical scope of the present invention.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is widely used in fields of molding of composite material structures which are huge in size and have a substantially cylindrical shape, such as a fuselage of an aircraft.

The invention claimed is:
1. A mold used for manufacturing a composite material structure, the mold being inserted into the composite material structure of a substantially cylindrical shape, and used, said mold comprising:
  a plurality of segments of at least two kinds, the segments having a rectangular plate shape and each having an obverse surface having a convex-shape, the obverse surface being one of main surfaces of each of the segments; and
  a pair of annular retaining members for fastening both end surfaces of each of the plurality of segments;
  wherein:
  the plurality of segments are retained as a single cylindrical member such that the end surfaces of each of the plurality of segments are fastened to the annular retaining members in a state where the obverse surface of each of the plurality of segments faces outward, and side surfaces of adjacent segments are joined together, and
  the plurality of segments include:
    a first segment having a shape in which side surfaces thereof face a horizontal direction or a direction which is inclined upwardly with respect to the horizontal direction, in a state where the first segment is placed such that the obverse surface thereof is at an upper side; and
    a second segment having a shape in which side surfaces thereof face a direction which is inclined downwardly with respect to the horizontal direction, in a state where the second segment is placed such that the obverse surface thereof is at the upper side, and
  the mold further comprising:
  an annular fastening/retaining mechanism which lifts up the first segment or the second segment, fastens the end surfaces of the first segment or the second segment to fastening surfaces of the annular retaining members, and retains a state in which the end surfaces of the first segment or the second segment are fastened to the fastening surfaces of the annular retaining members, the annular fastening/retaining mechanism including:
    a male fastener member provided on each of the end surfaces of the first segment or the second segment and including a protruding portion protruding in a direction from a reverse surface of the segment toward the obverse surface of the segment;
    a female fastener member provided on the fastening surface of each of the annular retaining members and having a recess or an opening formed to extend in the direction from the reverse surface of the segment toward the obverse surface of the segment, the protruding portion of the male fastener member being inserted into the recess or the opening when the segment is lifted up; and a fastened state retaining member provided on either each of the end surfaces of the segment or the fastening surface of each of the annular retaining members, to retain a state in which the male fastener member is inserted into the female fastener member, the protruding portion of the male fastener member having a through-hole penetrating the protruding portion, the fastened state retaining member including a wedge member positioned such that the wedge member is extendable to and retractable from the protruding portion of the male fastener member inserted into the recess or the opening of the female fastener member, and the wedge member being movable to an advanced position toward the protruding portion and inserted into the through-hole of the protruding portion to retain a state in which the male fastener member is inserted into the female fastener member.

2. The mold used for manufacturing the composite material structure, according to claim 1, wherein the male fastener member includes two male fastener members provided on each of the end surfaces of the first segment or the second segment; and the female fastener member includes female fastener members provided on the fastening surface of each of the annular retaining members to correspond to the two male fastener members, respectively.

3. The mold used for manufacturing the composite material structure, according to claim 1, further comprising:

an annular fastening/guide mechanism for positioning the protruding portion of the male fastener member when the protruding portion is inserted into the recess or the opening of the female fastener member.

4. The mold used for manufacturing the composite material structure, according to claim 3, wherein the annular fastening/guide mechanism includes:

a male guide member provided to protrude from each of the end surfaces of the first segment or the second segment; and a female guide member provided on the fastening surface of each of the annular retaining members in a location corresponding to the male guide member, the female guide member having a cutout or a recess into which the male guide member is inserted.

5. A mold used for manufacturing a composite material structure, the mold being inserted into the composite material structure of a substantially cylindrical shape, and used, said mold comprising:

a plurality of segments of at least two kinds, the segments having a rectangular plate shape and each having an obverse surface having a convex-shape, the obverse surface being one of main surfaces of each of the segments;

a pair of annular retaining members for fastening both end surfaces of each of the plurality of segments, wherein:

the plurality of segments are retained as a single cylindrical member such that the end surfaces of each of the plurality of segments are fastened to the annular retaining members in a state where the obverse surface of each of the plurality of segments faces outward, and side surfaces of adjacent segments are joined together, and the plurality of segments include:

a first segment having a shape in which side surfaces thereof face a horizontal direction or a direction which is inclined, upwardly with respect to the horizontal direction, in a state where the first segment is placed such that the obverse surface thereof is at an upper side; and a second segment having a shape in which side surfaces thereof face a direction which is inclined downwardly with respect to the horizontal direction, in a state where the second segment is placed such that the obverse surface thereof is at the upper side, and comprising:

a segment joining/retaining mechanism provided on each of the side surfaces of the first segment or the second segment to join the side surfaces of different segments, and to retain a state in which the side surfaces are joined together, wherein the segment joining/retaining mechanism includes:

a male joining member provided on each of the side surfaces of the first segment and having a protruding portion protruding in a direction from the reverse surface of the first segment toward the obverse surface of the first segment;

a female joining member provided on each of the side surfaces of the second segment in a location corresponding the male joining member and having a recess or an opening into which the protruding portion is inserted; and a joined state retaining member provided on each of the side surfaces of the first segment or each of the side surfaces of the second segment to retain a state in which the male joining member is inserted into the female joining member, and wherein:

the protruding portion of the male joining member has a through-hole penetrating the protruding portion, the joined state retaining member includes a wedge member positioned such that the wedge member is extendable to and retractable from the protruding portion of the male fastener member inserted into the recess or the opening of the female joining member, and the wedge member is moveable to an advanced position toward the protruding portion and inserted into the through-hole of the protruding portion to retain a state in which the male joining member is inserted into the female joining member.

6. The mold used for manufacturing the composite material structure, according to claim 5, wherein the second segment is provided on each of the side surfaces with an eave portion in which an edge portion connected to the obverse surface protrudes outward relative to the side surface; and the female joining member is provided on each of the side surfaces of the second segment such that the female joining member is hidden by the eave portion when viewed from the obverse surface.

7. The mold used for manufacturing the composite material structure, according to claim 5, further comprising:

a segment joining/guide mechanism for positioning the protruding portion of the male joining member when the protruding portion is inserted into the recess or the opening of the female joining member.

8. The mold used for manufacturing the composite material structure, according to claim 7, wherein the segment joining/guide mechanism includes:

a female guide member provided on each of the side surfaces of the first segment in a location closer to the obverse surface than the male joining member, the female guide member having a cutout portion or a recess portion extending in a direction from the obverse surface toward the reverse surface and including a portion whose dimension decreases gradually in the direction from the obverse surface toward the reverse surface; and a male guide member provided on each of the side surfaces of the second segment in a location closer to the obverse surface than the female joining member, the male guide member including an insertion portion inserted into the cutout portion or the recess portion of the female guide member.

9. The mold used for manufacturing the composite material structure, according to claim 6, wherein the eave portion of the second segment has a tip end having a folded edge portion folded back in a direction from the obverse surface toward the reverse surface; and the segment joining/retaining mechanism includes a clamp member for clamping the folded edge portion of the second segment via the side surface of the first segment in a state where the obverse surface of the first segment and the obverse surface of the second segment are positioned form a continuous surface.

10. The mold used for manufacturing the composite material structure, according to claim 1, wherein the first segment includes three first segments and the second segment includes three second segments;

the annular retaining members have an oval shape; and the first segments and the second segments are assembled such that the first segment and the second segment are joined together alternately, to construct a single cylindrical shape in an oval shape conforming to the oval shape of the annular retaining members.

11. The mold used for manufacturing the composite material structure, according to claim 1, wherein each of the obverse surface of the first segment and the obverse surface of the second segment has a plurality of recesses filled with a frame material of the composite material structure.

12. The mold used for manufacturing the composite material structure, according to claim 5, wherein the first segment includes three first segments and the second segment includes three second segments;

the annular retaining members have an oval shape; and the first segments and the second segments are assembled such that the first segment and the second segment are joined together alternately, to construct a single cylindrical shape in an oval shape conforming to the oval shape of the annular retaining members.

13. The mold used for manufacturing the composite material structure, according to claim 12, wherein each of the obverse surface of the first segment and the obverse surface of the second segment has a plurality of recesses filled with a frame material of the composite material structure.

* * * * *